(12) United States Patent
Price et al.

(10) Patent No.: US 11,636,645 B1
(45) Date of Patent: Apr. 25, 2023

(54) RAPID TARGET ACQUISITION USING GRAVITY AND NORTH VECTORS

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US); Sudipta Narayan Sinha, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/524,270

(22) Filed: Nov. 11, 2021

(51) Int. Cl.
*G06T 15/20* (2011.01)
*G06T 7/00* (2017.01)
*G06T 7/33* (2017.01)

(52) U.S. Cl.
CPC .............. *G06T 15/205* (2013.01); *G06T 7/33* (2017.01); *G06T 7/97* (2017.01)

(58) Field of Classification Search
CPC . G06T 2207/30036; G06T 2207/30004; G06T 7/0012; G06T 7/0014; G06T 7/251; G06T 7/33; G06T 7/55; G06T 7/73; G06T 17/00; G06T 2207/10028; G06T 2207/30241; G06T 2207/30244; G06T 2210/41; G06T 7/248; G06T 7/254; G06T 7/74
See application file for complete search history.

(56) References Cited

U.S. PATENT DOCUMENTS

| | | | | |
|---|---|---|---|---|
| 10,313,656 | B2* | 6/2019 | Sadi | H04N 5/247 |
| 2015/0294189 | A1* | 10/2015 | Benhimane | G06V 10/772 |
| | | | | 382/195 |
| 2019/0114797 | A1* | 4/2019 | Bleyer | G06T 7/579 |
| 2019/0238887 | A1* | 8/2019 | Aflaki Beni | H04N 19/103 |

* cited by examiner

*Primary Examiner* — Ming Wu
(74) *Attorney, Agent, or Firm* — Workman Nydegger

(57) ABSTRACT

Techniques for aligning images generated by two cameras are disclosed. This alignment is performed by computing a relative 3D orientation between the two cameras. A first gravity vector for a first camera and a second gravity vector for a second camera are determined. A first camera image is obtained from the first camera, and a second camera image is obtained from the second camera. A first alignment process is performed to partially align the first camera's orientation with the second camera's orientation. This process is performed by aligning the gravity vectors, thereby resulting in two degrees of freedom of the relative 3D orientation being eliminated. Visual correspondences between the two images are identified. A second alignment process is performed to fully align the orientations. This process is performed by using the identified visual correspondences to identify and eliminate a third degree of freedom of the relative 3D orientation.

20 Claims, 20 Drawing Sheets

RAPID TARGET ACQUISITION USING GRAVITY AND NORTH VECTORS

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

A MR system may also employ different types of cameras in order to display content to users, such as in the form of a passthrough image. A passthrough image or view can aid users in avoiding disorientation and/or safety hazards when transitioning into and/or navigating within a MR environment. A MR system can present views captured by cameras in a variety of ways. The process of using images captured by world-facing cameras to provide views of a real-world environment creates many challenges, however.

Some of these challenges occur when attempting to align image content from multiple cameras, such as an integrated "system camera" and a detached "external camera" when generating the passthrough image. Challenges also occur when additional visualizations are provided in the resulting overlaid passthrough image, where these visualizations are designed to indicate a spatial relationship between the system camera and the external camera. The time taken to i) generate a system camera image and an external camera image, ii) overlay and align the content, and then iii) display the resulting overlaid passthrough image with additional visualizations is not instantaneous.

Because of that, movement of the system camera and/or the external camera may occur between the time when the images are generated and when the final passthrough image is displayed. Such movement results in a visible latency or lagging effect and is disruptive to the user. Additionally, traditional techniques often relied on inadequate images when attempting to perform the alignment operations. Because of these inadequate images, the alignment process would often fail, and other techniques would need to be performed to provide the overlaid image. Accordingly, aligning image content provides substantial benefits, especially in terms of hologram placement and generation, so these problems present serious obstacles to the technical field. As such, there is a substantial need in the field to improve how images are aligned with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, hardware storage devices, etc.), and methods for aligning images generated by two cameras. That alignment is performed by computing a relative three-dimensional (3D) orientation between the two cameras.

In some embodiments, a first gravity vector for a first camera and a second gravity vector for a second camera, which is physically detached from the first camera, are determined. The embodiments obtain a first camera image from the first camera and a second camera image from the second camera. The first camera had a first orientation when the first camera image was generated, and the second camera had a second orientation when the second camera image was generated. A first alignment process is performed to partially align the first orientation with the second orientation. This process is performed by aligning the first gravity vector with the second gravity vector, thereby resulting in two degrees of freedom of the relative 3D orientation being eliminated. The embodiments also identify visual correspondences between the first camera image and the second camera image. A second alignment process is performed to fully align the first orientation with the second orientation. This process is performed by using the identified visual correspondences to identify and eliminate a third degree of freedom of the relative 3D orientation. Subsequent to performing the first alignment process and the second alignment process, the embodiments generate an overlaid image by overlaying content included in one of the first camera image or the second camera image onto corresponding content included in the other one of the first camera image or the second camera image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein relate to systems, devices (e.g., wearable devices, hardware storage devices, etc.), and methods for aligning images generated by two cameras. That alignment is performed by computing a relative three-dimensional (3D) orientation between the two cameras.

In some embodiments, a first gravity vector for a first camera and a second gravity vector for a second camera are determined. The embodiments obtain a first camera image from the first camera and a second camera image from the second camera. A first alignment process is performed to partially align the first camera's orientation with the second camera's orientation. This process is performed by aligning the gravity vectors, thereby resulting in two degrees of freedom of the relative 3D orientation being eliminated. The embodiments also identify visual correspondences between the two images. A second alignment process is performed to fully align the orientations. This process is performed by using the identified visual correspondences to identify and eliminate a third degree of freedom of the relative 3D orientation. The embodiments also generate an overlaid image by overlaying content included in one of the first or second camera images onto corresponding content included in the other one of the first or second camera images.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide numerous benefits and advantages to the technical field. That is, in accordance with the disclosed principles, the embodiments improve how image content is aligned from different images, thereby producing an enhanced image. In some cases, the embodiments can perform this alignment without reliance on visual correspondences. As a result, the disclosed operations can be performed even if there is little to no isothermal contrasts or sufficient lighting in the environment. In this sense, the disclosed embodiments expand the operational range and usefulness of the MR systems.

As a result of performing these operations, the user's experience is significantly improved, thereby leading to an improvement in the technology. Improved image alignment and visualization are also achieved. Accordingly, these and numerous other benefits will be described throughout the remaining portions of this disclosure.

Example MR Systems and HMDs

Figure 1:
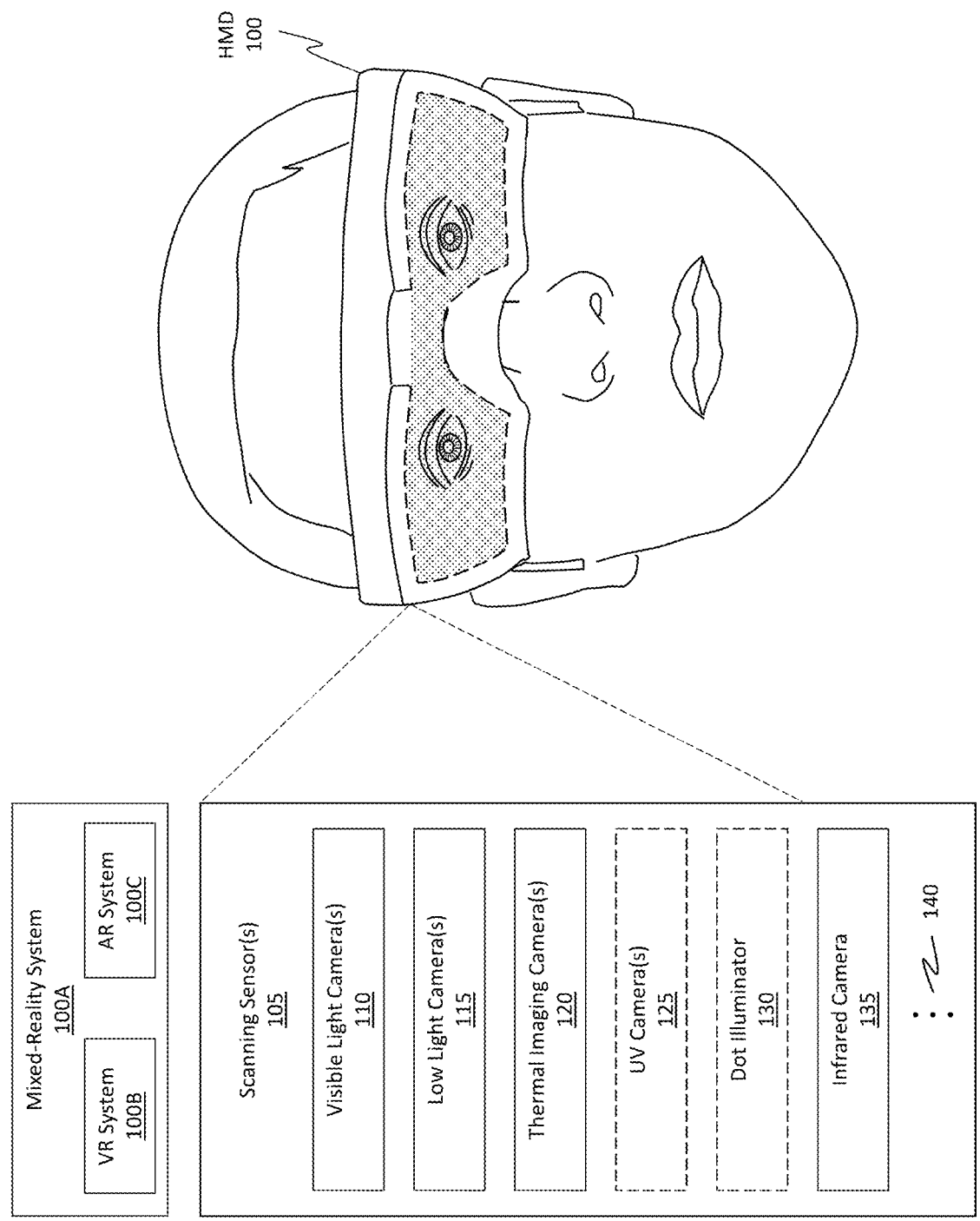
FIG. 1 illustrates an example head mounted device (HMD) configured to perform the disclosed operations.

Attention will now be directed to FIG. 1, which illustrates an example of a head mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. That is, any type of camera system can be used, even camera systems entirely removed or separate from an HMD. As such, the disclosed principles should be interpreted broadly to encompass any type of camera use scenario. Some embodiments may even refrain from actively using a camera themselves and may simply use the data generated by a camera. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualizations of the user's environment. As used herein, a "passthrough" visualization refers to a visualization that reflects the perspective of the environment from the user's point of view. To generate this passthrough visualization, the HMD 100 may use its scanning sensor(s) 105 to scan, map, or otherwise record its surrounding environment, including any objects in the environment, and to pass that data on to the user to view. As will be described shortly, various transformations may be applied to the images prior to displaying them to the user to ensure the displayed perspective matches the user's expected perspective.

To generate a passthrough image, the scanning sensor(s) 105 typically rely on its cameras (e.g., head tracking cameras, hand tracking cameras, depth cameras, or any other type of camera) to obtain one or more raw images (aka "texture images") of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections, if needed.

From the passthrough visualizations, a user will be able to perceive what is currently in his/her environment without having to remove or reposition the HMD 100. Furthermore, as will be described in more detail later, the disclosed passthrough visualizations can also enhance the user's ability to view objects within his/her environment (e.g., by displaying additional environmental conditions that may not have been detectable by a human eye). As used herein, a so-called "overlaid image" can be a type of passthrough image.

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include visible light camera(s) 110, low light camera(s) 115, thermal imaging camera(s) 120, potentially (though not necessarily, as represented by the dotted box in FIG. 1) ultraviolet (UV) camera(s) 125, potentially (though not necessarily, as represented by the dotted box) a dot illuminator 130, and even an infrared camera 135. The ellipsis 140 demonstrates how any other type of camera or camera system (e.g., depth cameras, time of flight cameras, virtual cameras, depth lasers, etc.) may be included among the scanning sensor(s) 105.

As an example, a camera structured to detect mid-infrared wavelengths may be included within the scanning sensor(s) 105. As another example, any number of virtual cameras that are reprojected from an actual camera may be included among the scanning sensor(s) 105 and may be used to generate a stereo pair of images. In this manner, the scanning sensor(s) 105 may be used to generate the stereo pair of images. In some cases, the stereo pair of images may be obtained or generated as a result of performing any one or more of the following operations: active stereo image generation via use of two cameras and one dot illuminator (e.g., dot illuminator 130); passive stereo image generation via use of two cameras; image generation using structured light via use of one actual camera, one virtual camera, and one dot illuminator (e.g., dot illuminator 130); or image generation using a time of flight (TOF) sensor in which a baseline is present between a depth laser and a corresponding camera and in which a field of view (FOV) of the corresponding camera is offset relative to a field of illumination of the depth laser.

The visible light camera(s) 110 are typically stereoscopic cameras, meaning that the fields of view of the two or more visible light cameras at least partially overlap with one another. With this overlapping region, images generated by the visible light camera(s) 110 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 110 can be used to not only generate passthrough visualizations, but they can also be used to determine object depth. In some embodiments, the visible light camera(s) 110 can capture both visible light and IR light.

It should be noted that any number of cameras may be provided on the HMD 100 for each of the different camera types (aka modalities). That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

Figure 2:
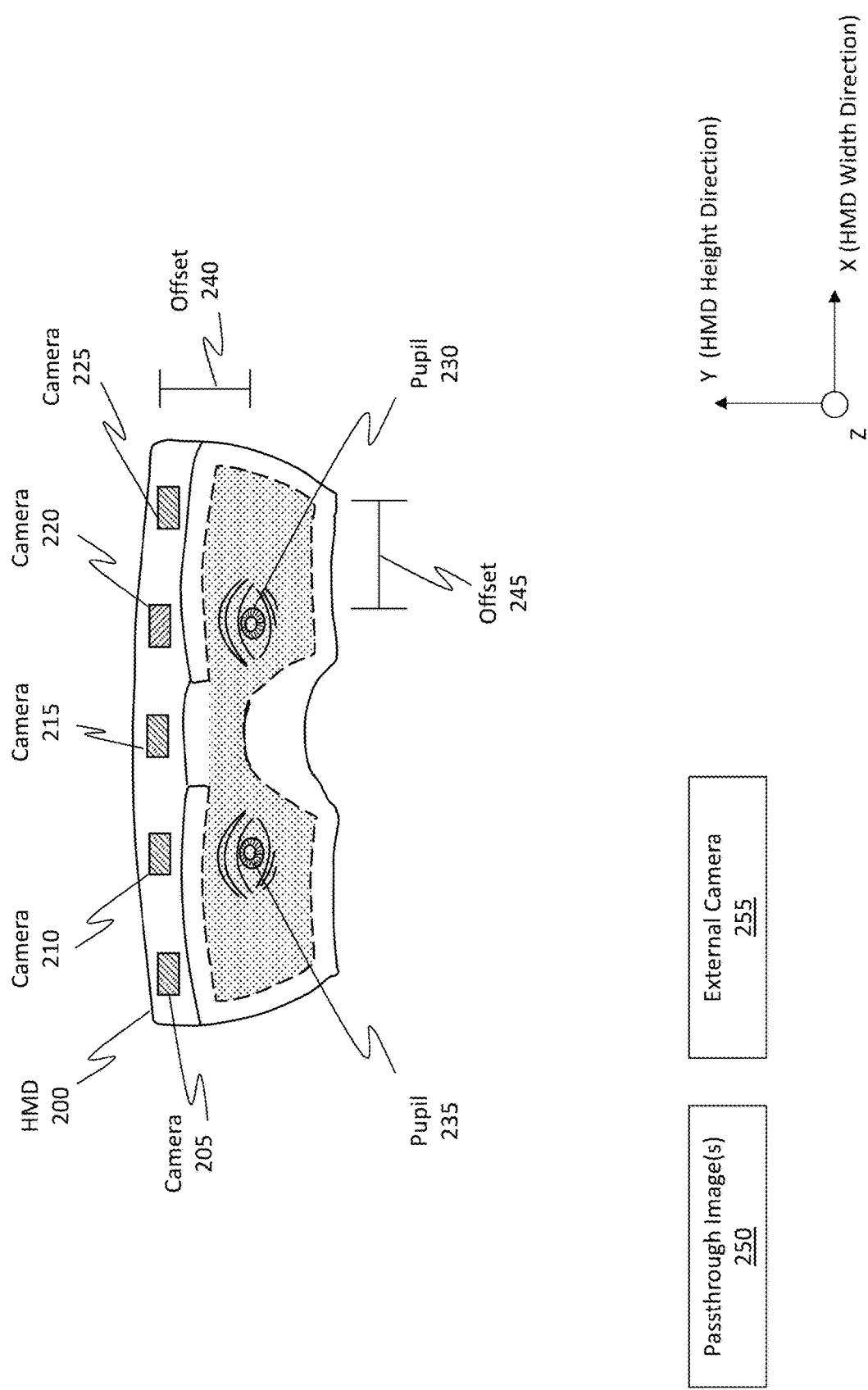
FIG. 2 illustrates another configuration of an HMD.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, and the UV camera(s) 125 from FIG. 1. While only 5 cameras are illustrated in FIG. 2, HMD 200 may include more or less than 5 cameras. Any one of those cameras can be referred to as a "system camera."

In some cases, the cameras can be located at specific positions on the HMD 200. In some cases, a first camera (e.g., perhaps camera 220) is disposed on the HMD 200 at a position above a designated left eye position of a user who wears the HMD 200 relative to a height direction of the HMD. For example, the camera 220 is positioned above the pupil 230. As another example, the first camera (e.g., camera 220) is additionally positioned above the designated left eye position relative to a width direction of the HMD. That is, the camera 220 is positioned not only above the pupil 230 but also in-line relative to the pupil 230. When a VR system is used, a camera may be placed directly in front of the designated left eye position. With reference to FIG. 2, a camera may be physically disposed on the HMD 200 at a position in front of the pupil 230 in the z-axis direction.

When a second camera is provided (e.g., perhaps camera 210), the second camera may be disposed on the HMD 200 at a position above a designated right eye position of a user who wears the HMD relative to the height direction of the HMD. For example, the camera 210 is above the pupil 235. In some cases, the second camera is additionally positioned above the designated right eye position relative to the width direction of the HMD. When a VR system is used, a camera may be placed directly in front of the designated right eye position. With reference to FIG. 2, a camera may be physically disposed on the HMD 200 at a position in front of the pupil 235 in the z-axis direction.

When a user wears HMD 200, HMD 200 fits over the user's head and the HMD 200's display is positioned in front of the user's pupils, such as pupil 230 and pupil 235. Often, the cameras 205-225 will be physically offset some distance from the user's pupils 230 and 235. For instance, there may be a vertical offset in the HMD height direction (i.e. the "Y" axis), as shown by offset 240. Similarly, there may be a horizontal offset in the HMD width direction (i.e. the "X" axis), as shown by offset 245.

HMD 200 is configured to provide passthrough image(s) 250 for the user of HMD 200 to view. In doing so, HMD 200 is able to provide a visualization of the real world without requiring the user to remove or reposition HMD 200. These passthrough image(s) 250 effectively represent the view of the environment from the HMD's perspective. Cameras 205-225 are used to provide these passthrough image(s) 250. The offset (e.g., offset 240 and 245) between the cameras and the user's pupils results in parallax. In order to provide these passthrough image(s) 250, the embodiments can perform parallax correction by applying various transformations and reprojections on the images in order to change the initial perspective represented by an image into a perspective matches that of the user's pupils. Parallax correction relies on the use of a depth map in order to make the reprojections.

In some implementations, the embodiments utilize a planar reprojection process to correct parallax when generating the passthrough images as opposed to performing a full three-dimensional reprojection. Using this planar reprojection process is acceptable when objects in the environment are sufficiently far away from the HMD. Thus, in some cases, the embodiments are able to refrain from performing three-dimensional parallax correction because the objects in the environment are sufficiently far away and because that distance results in a negligible error with regard to depth visualizations or parallax issues.

Any of the cameras 205-225 constitute what is referred to as a "system camera" because they are integrated parts of the HMD 200. In contrast, the external camera 255 is physically separate and detached from the HMD 200 but can communicate wirelessly with the HMD 200. As will be described shortly, it is desirable to align images (or image content) generated by the external camera 255 with images (or image content) generated by a system camera to then generate an overlaid image, which can operate as a passthrough image. Often, the angular resolution of the external camera 255 is higher (i.e. more pixels per degree and not just more pixels) than the angular resolution of the system camera, so the resulting overlaid image provides enhanced image content beyond that which is available from using only the system camera image. Additionally, or alternatively, the modalities of the external camera 255 and the system camera may be different, so the resulting overlaid image can also include enhanced information. As an example, suppose the external camera 255 is a thermal imaging camera. The resulting overlaid image can, therefore, include visible light image content and thermal image content. Accordingly, providing an overlaid passthrough image is highly desirable. It should be noted that the external camera 255 may be any of the camera types listed earlier. Additionally, there may be any number of external cameras, without limit.

Example Scenarios

Figure 3:
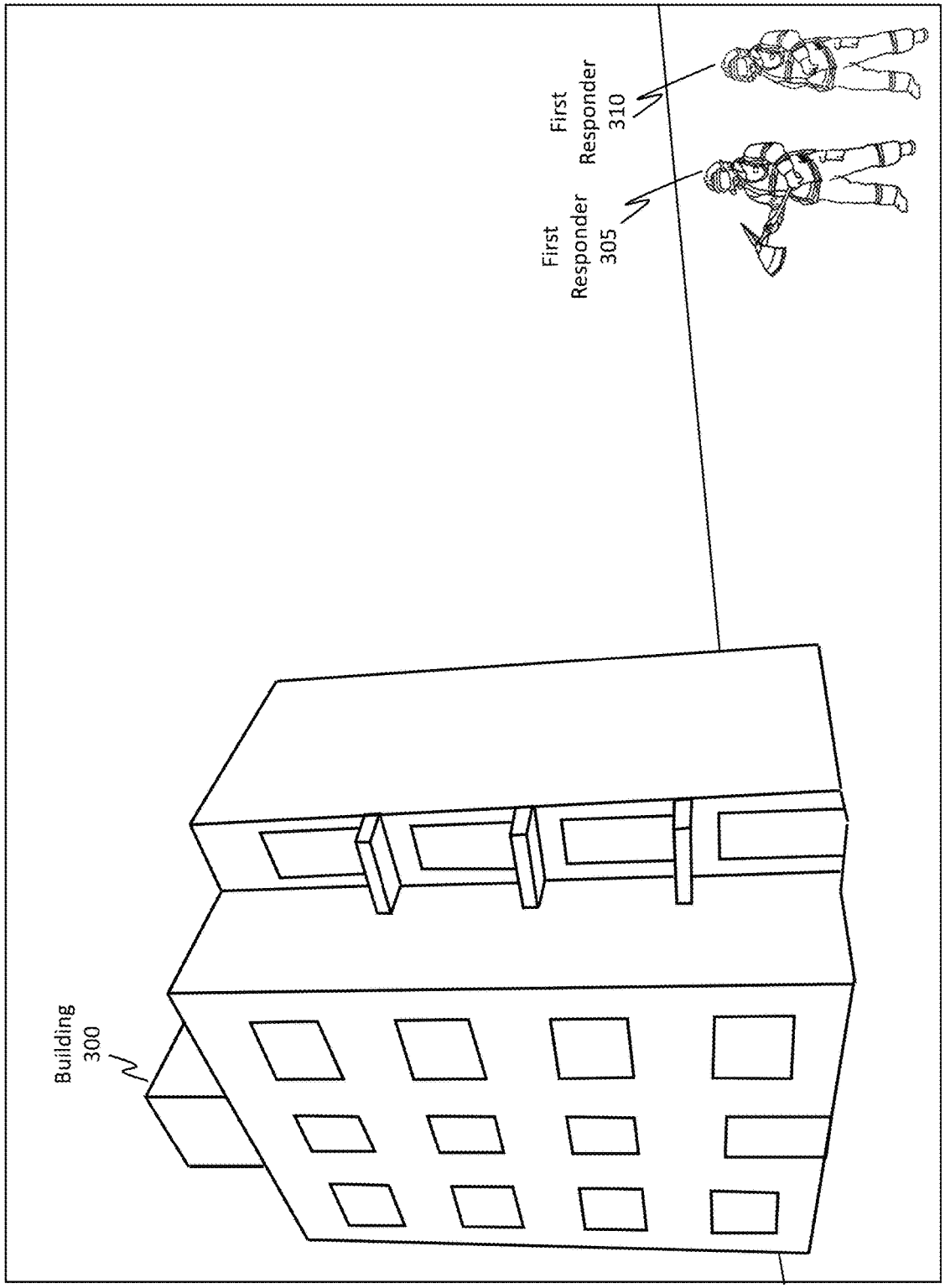
FIG. 3 illustrates an example scenario in which the disclosed principles may be practiced.
Figure 4:
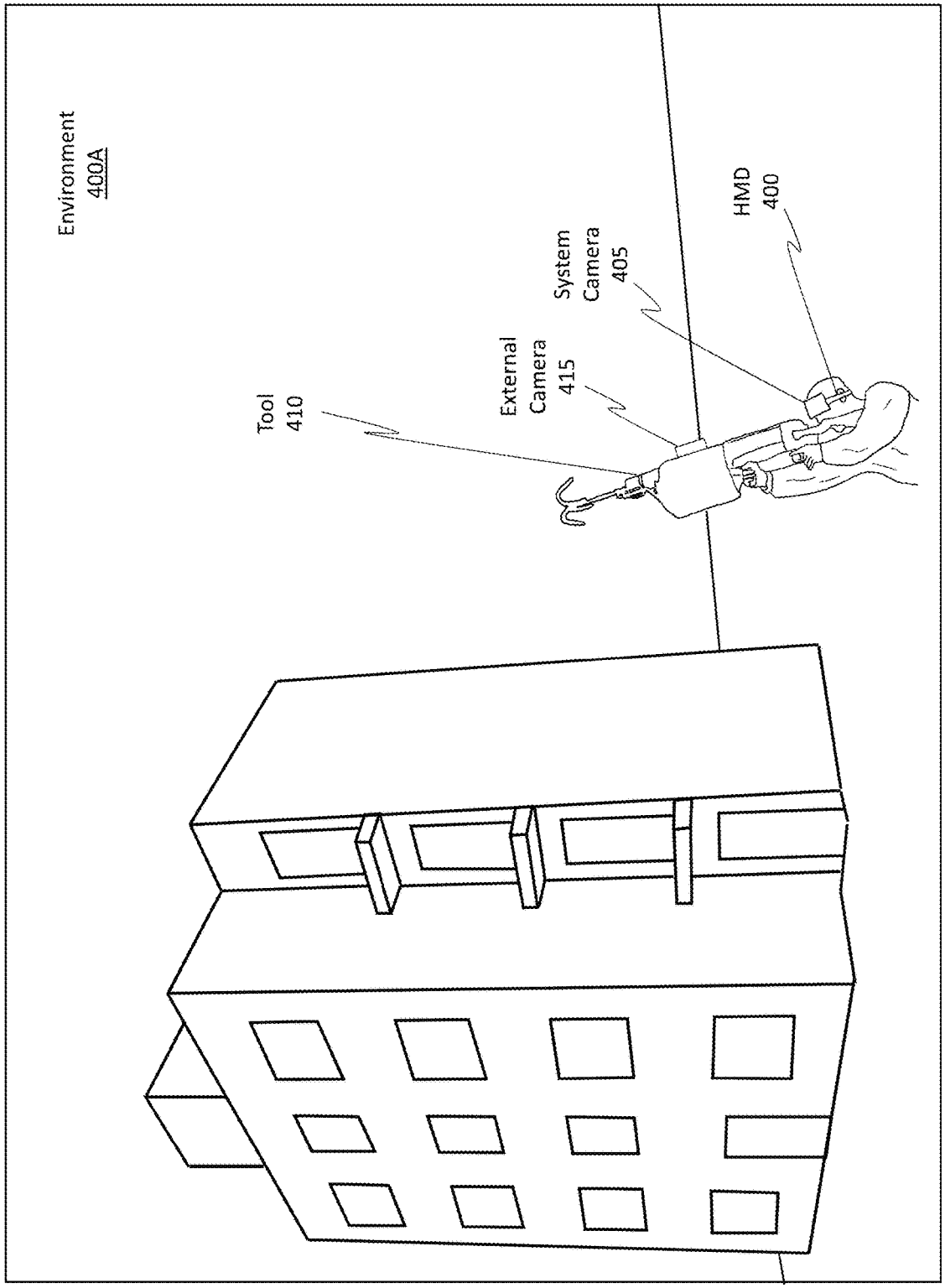
FIG. 4 illustrates another example scenario.

Attention will now be directed to FIG. 3, which illustrates an example scenario in which the HMDs discussed in FIGS. 1 and 2 may be used. FIG. 3 shows a building 300 and a first responder 305 and another first responder 310. In this example scenario, the first responders 305 and 310 are desirous to scale the building 300. FIG. 4 shows one example technique for performing this scaling feat.

FIG. 4 shows a first responder wearing an HMD 400, which is representative of the HMDs discussed thus far, in an environment 400A. HMD 400 includes a system camera 405, as discussed previously. Furthermore, the first responder is using a tool 410 that includes an external camera 415, which is representative of the external camera 255 of FIG. 2. In this case, the tool 410 is a grappling gun that will be used to shoot a rope and hook onto the building to allow the first responder to scale the building. By aligning the image content generated by the external camera 415 with the image content generated by the system camera 405, the user will be able to better discern where the tool 410 is being aimed.

Figure 5:
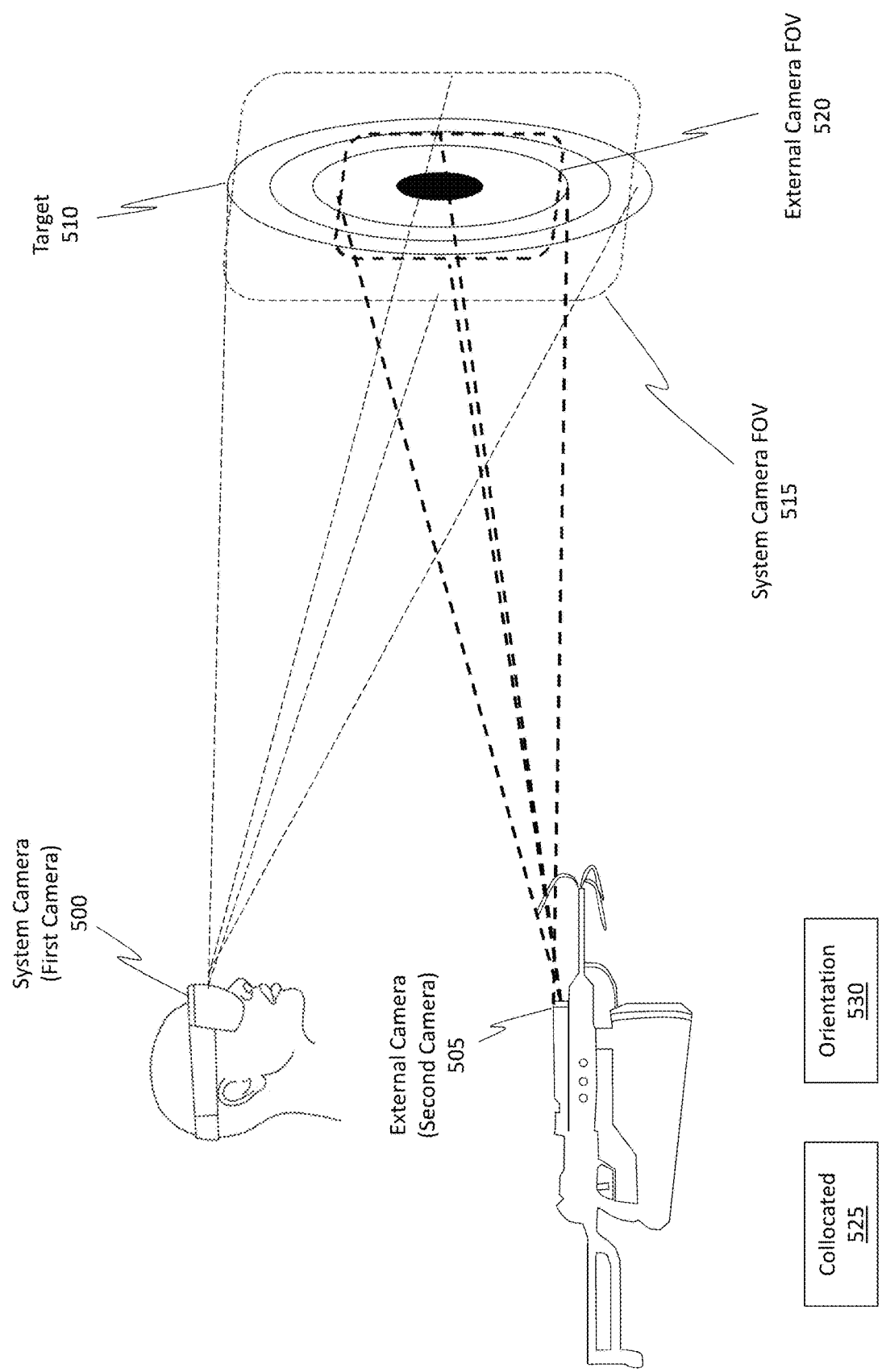
FIG. 5 illustrates how a system camera and an external camera can be used to perform the disclosed operations.

That is, in accordance with the disclosed principles, it is desirable to provide an improved platform or technique by which a user (e.g., the first responders) can aim a tool (e.g., the tool 410) using the HMD 400, the system camera 405, and the external camera 415 as a combined aiming interface. FIG. 5 shows one such example.

FIG. 5 shows a system camera 500 (aka HMD camera) mounted on an HMD, where the system camera 500 is representative of the system camera 405 of FIG. 4, and a tool (e.g., a grappling gun) that includes an external camera 505, which is representative of the external camera 415. It should be noted how the optical axis of the external camera 505 is aligned with the aiming direction of the tool. As a consequence, the images generated by the external camera 505 can be used to determine where the tool is being aimed. One will appreciate how the tool can be any type of aimable tool, without limit. Accordingly, the system (first) camera 500 can be a head-mounted device (HMD) camera, and the external (second) camera 505 can be an external camera attached to a tool.

In FIG. 5, both the system camera 500 and the external camera 505 are being aimed at a target 510. To illustrate, the field of view (FOV) of the system camera 500 is represented by the system camera FOV 515 (aka HMD camera FOV), and the FOV of the external camera 505 is represented by the external camera FOV 520. Notice, the system camera FOV 515 is larger than the external camera FOV 520. Typically, the external camera 505 provides a very focused view, similar to that of a scope (i.e. a high level of angular resolution). As will be discussed in more detail later, the external camera 505 sacrifices a wide FOV for an increased resolution and increased pixel density. Accordingly, in this example scenario, one can observe how in at least some situations, the external camera FOV 520 may be entirely overlapped or encompassed by the system camera FOV 515. Of course, in the event the user aims the external camera 505 in a direction where the system camera 500 is not aimed at, then the system camera FOV 515 and the external camera FOV 520 will not overlap.

As shown by collocated 525, the embodiments are able to make an assumption that the system camera 500 and the external camera 505 are collocated. By collocated, it is meant that the embodiments rely on an assumption that the two cameras are essentially located at the same position even though in reality they are not. When objects in the scene are located far away from the cameras, then the difference in actual positioning of the cameras can be disregarded, and the cameras can be considered to be collocated. Although an assumption can be made that the two cameras are collocated 525, those two cameras will likely have different three degree of freedom orientations (e.g., yaw, pitch, and roll), as shown by orientation 530. That is, the two cameras will have a relative three-dimensional (3D) orientation relative to one another.

Figure 6:
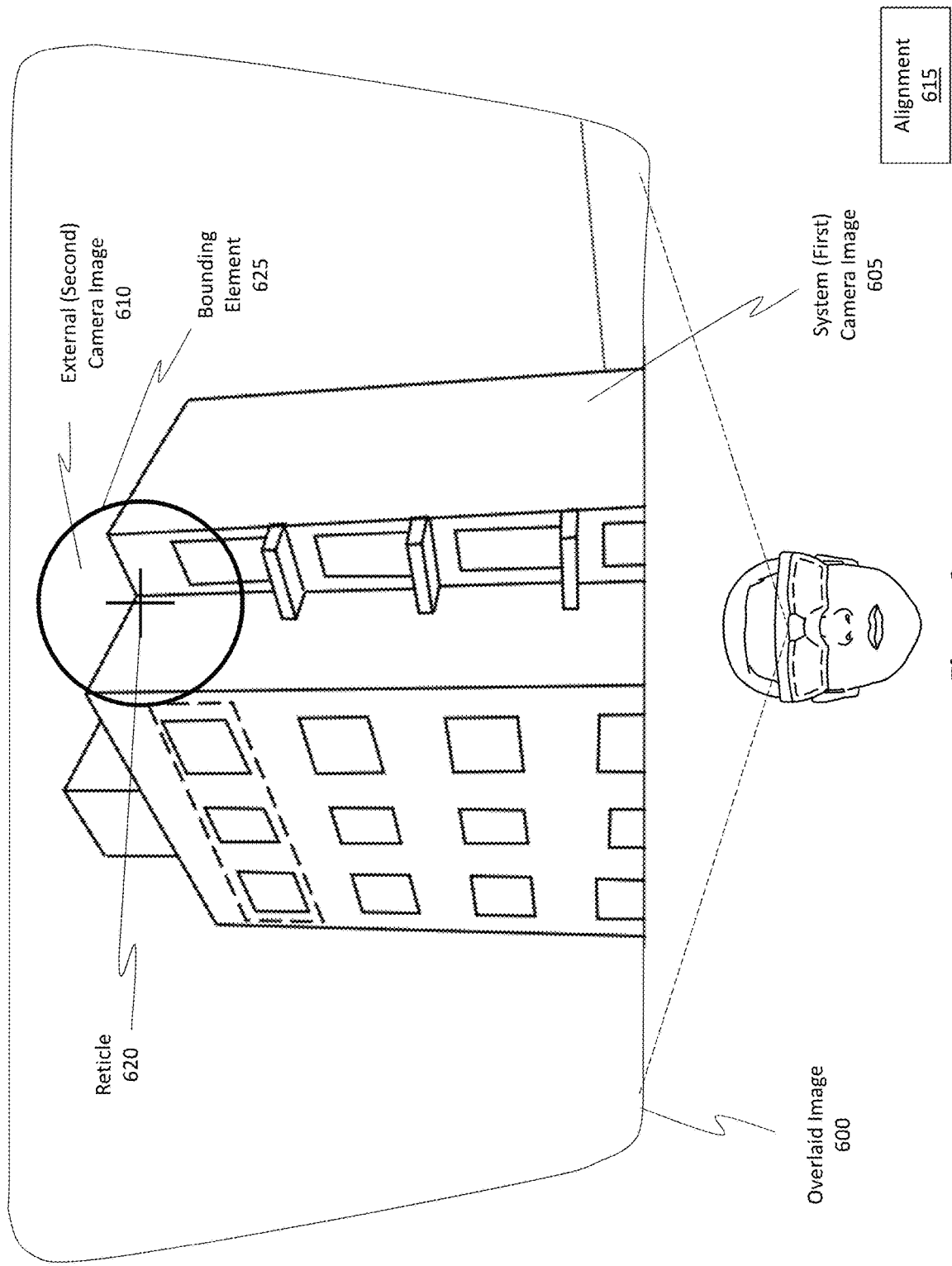
FIG. 6 illustrates an example of an overlaid image in which content from one image is overlaid onto corresponding content of another image.

FIG. 6 shows a resulting overlaid image 600 that can be generated by combining content from the images generated by the system camera 500 and the external camera 505 of FIG. 5. Specifically, the overlaid image 600 includes content from a system (first) camera image 605 and content from an external (second) camera image 610.

The embodiments are able to perform an alignment 615 process to align the content from the external camera image 610 onto corresponding content from the system camera image 605. For instance, because the fields of view of the two cameras at least partially overlap, the resulting images will include corresponding content. The embodiments can identify that corresponding content and then align the images to generate the overlaid image 600. In this example scenario, a reticle 620 is also included in the overlaid image 600.

Notice, the content from the external camera image 610 is also surrounded by a bounding element 625. In this case, the bounding element 625 is a circle, but any shape can be used, including a square, rectangle, triangle, or any polygon or irregular shape. The remaining portion of this disclosure will focus on different techniques for aligning image data.

Contrast in Image Data

Figure 7:
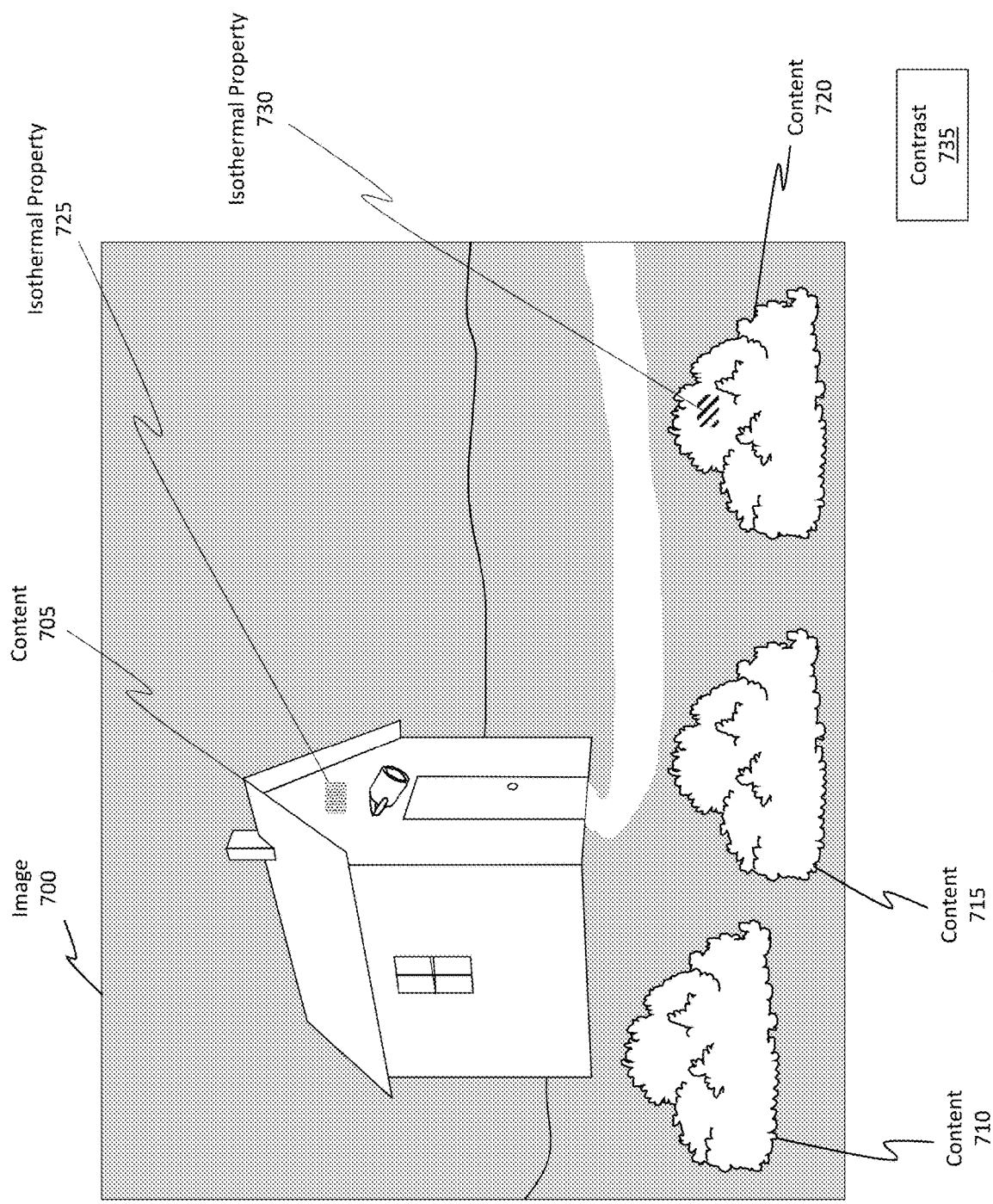
FIG. 7 illustrates an example of an image and how that image can illustrate different isothermal properties of the scene.

FIG. 7 shows an image 700 that was generated using any of the cameras mentioned thus far. Image 700 is shown as including content 705, 710, 715, and 720. Image 700 can be an example of a thermal image. In this particular scenario, the content 705 is shown as having an isothermal property 725, and the content 720 is shown as having an isothermal property 730. Notice the contrast 735 between those properties. In this scenario, the different items or content were visible in the image 700 because of the differences in contrast 735. The white and gray shading in the depiction illustrate the differences in appearance and contrast. Such is not the case, however, in the image 800 of FIG. 8.

Figure 8:
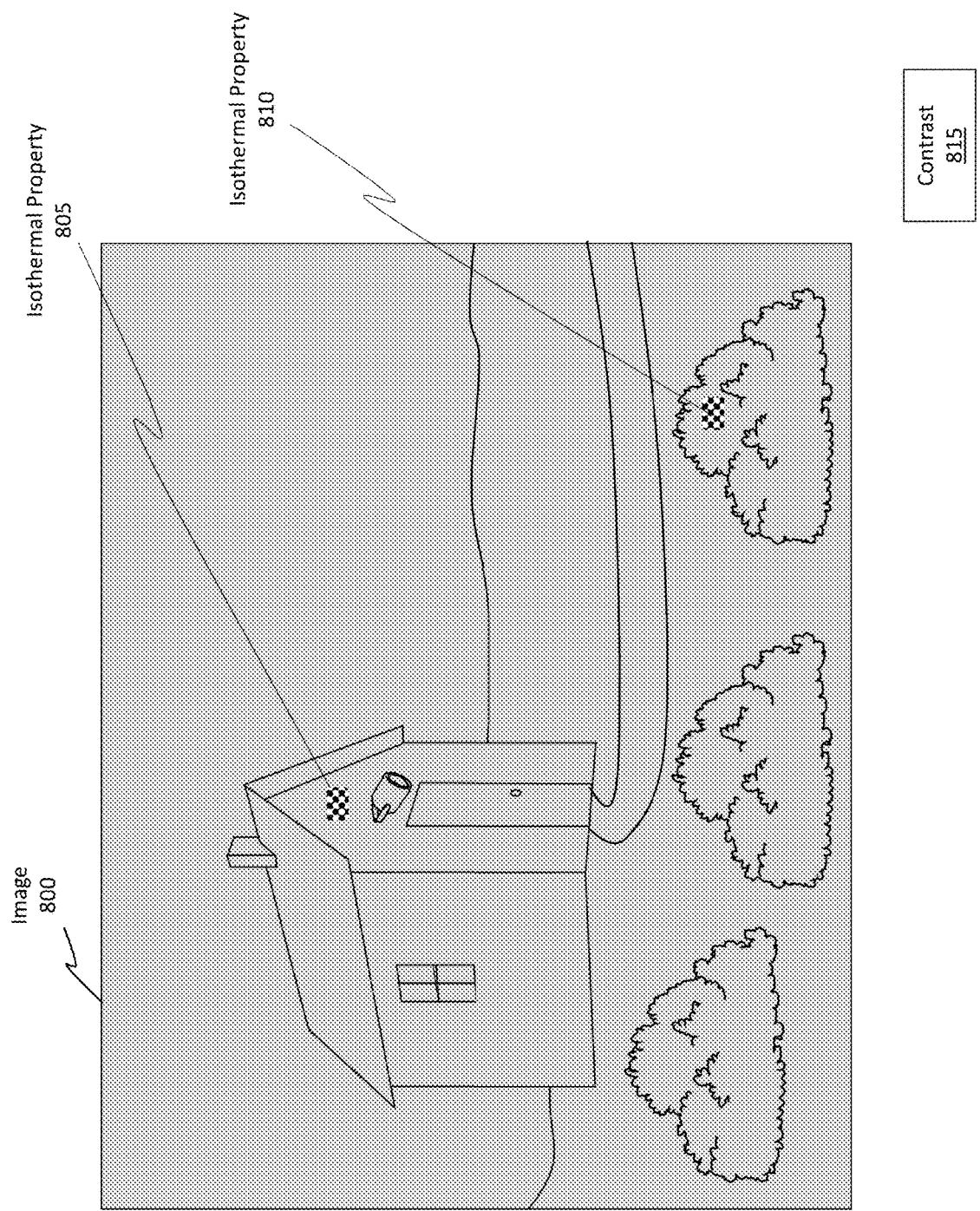
FIG. 8 illustrates another example of an image. Here, however, the objects in the scene have cooled to the point where there is little to no contrast in the isothermal properties.

FIG. 8 shows an image 800 where the isothermal property 805 is now the same as the isothermal property 810, resulting in uniform shading in the entire image. Here, there is little to no contrast 815 in the isothermal properties. As a consequence, there will not be any distinction between the different objects. Such a scenario can occur in instances where the environment has cooled to a uniform temperature.

Another such scenario can occur in a low light environment. For instance, it might be the case that the environment is too dark for the low light camera to generate a sufficiently contrasting image. Accordingly, the above conditions can occur for different camera modalities. When the contrast in the images is insufficient, the subsequent alignment process, which was traditionally based on detected visual correspondences, will be substantially impaired. What is needed, therefore, is a technique for aligning image content that is not wholly dependent on visual correspondences.

Aligning Image Data Using Gravity Vectors and Visual Correspondences

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
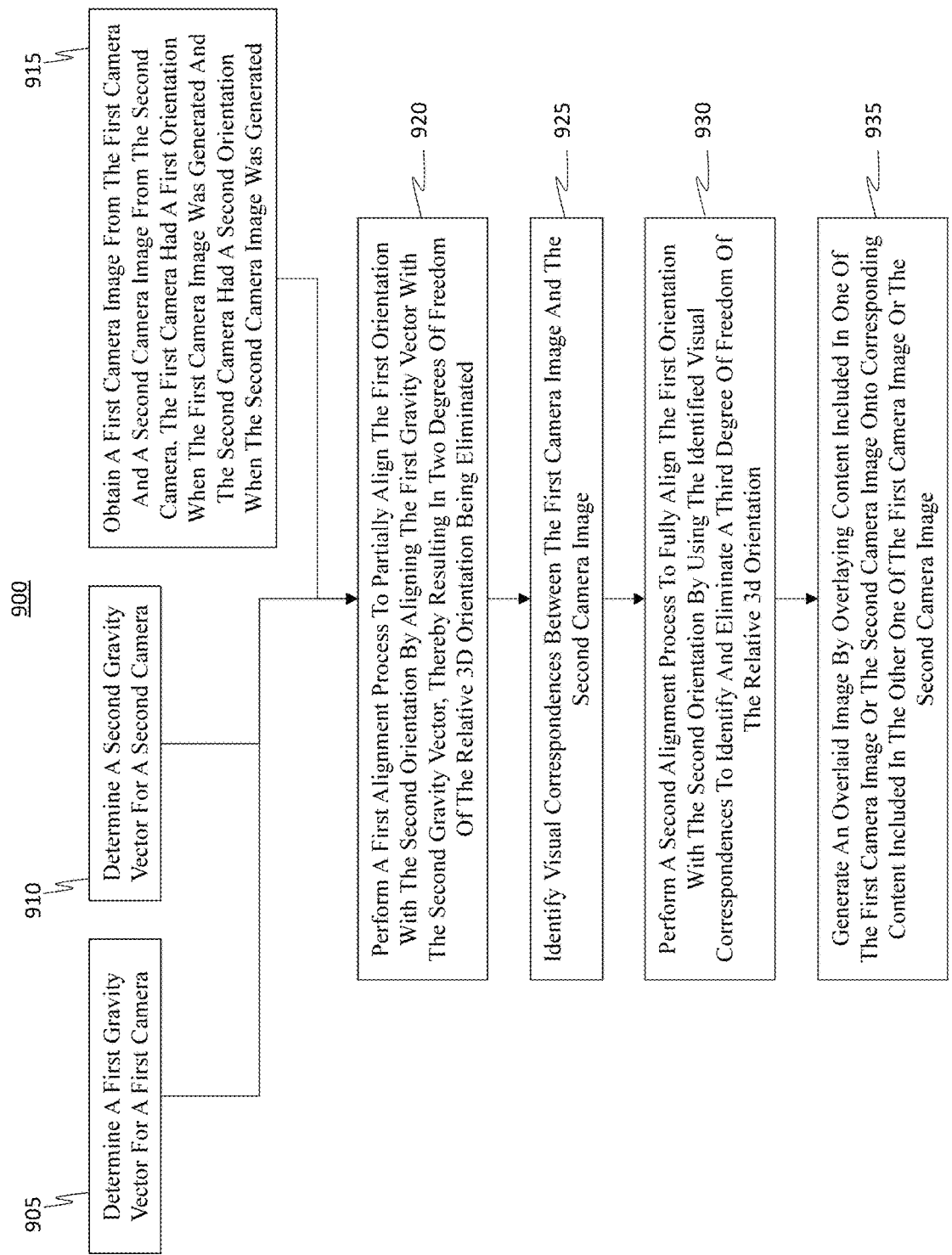
FIG. 9 illustrates a flowchart of an example method for aligning images from different cameras by computing a relative three-dimensional orientation between the two cameras.

Attention will now be directed to FIG. 9, which illustrates a flowchart of an example method 900 for aligning images generated by two cameras, where the alignment is performed by computing a relative three-dimensional (3D) orientation between the two cameras. FIGS. 10 through 16 are supporting illustrations for the method 900 and will be discussed with FIG. 9.

Method 900 includes an act (act 905) of determining a first gravity vector for a first camera. As used herein, the phrase "gravity vector" refers to the gravitational force that is applied to an object in any given space. In this scenario, the embodiments are able to identify the gravity vector of the first camera. Determining the gravity vector can be performed using an inertial measurement unit (IMU) associated with the first camera. Additionally, the first camera can, as an example, be the system camera 500 of FIG. 5.

In parallel with act 905, there is an act 910 of determining a second gravity vector for a second camera that is physically detached from the first camera. The external camera 505 in FIG. 5 can be an example of this second camera. This gravity vector can also be determined using an IMU associated with the second camera. That is, the first gravity vector can be determined using a first inertial measurement unit (IMU), and the second gravity vector can be determined using a second IMU.

In parallel with acts 905 and 910, there is an act 915 of obtaining a first camera image from the first camera and a second camera image from the second camera. The first camera had a first orientation (e.g., orientation 530 in FIG. 5) when the first camera image was generated and the second camera had a second orientation (e.g., orientation 530) when the second camera image was generated.

Figure 10:
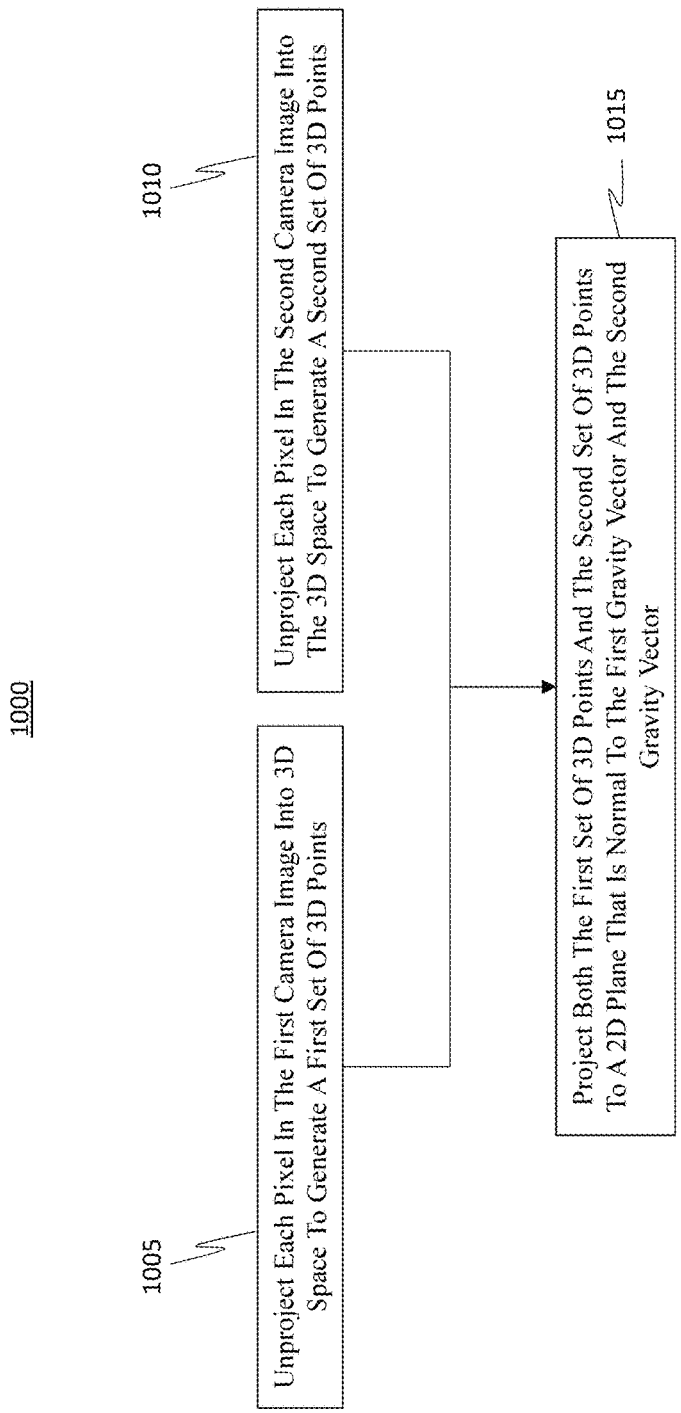
FIG. 10 illustrates an example process flow for performing a first alignment technique by aligning the gravity vectors of two cameras to eliminate two degrees of freedom of the relative 3D orientation between the two cameras.
Figure 11:
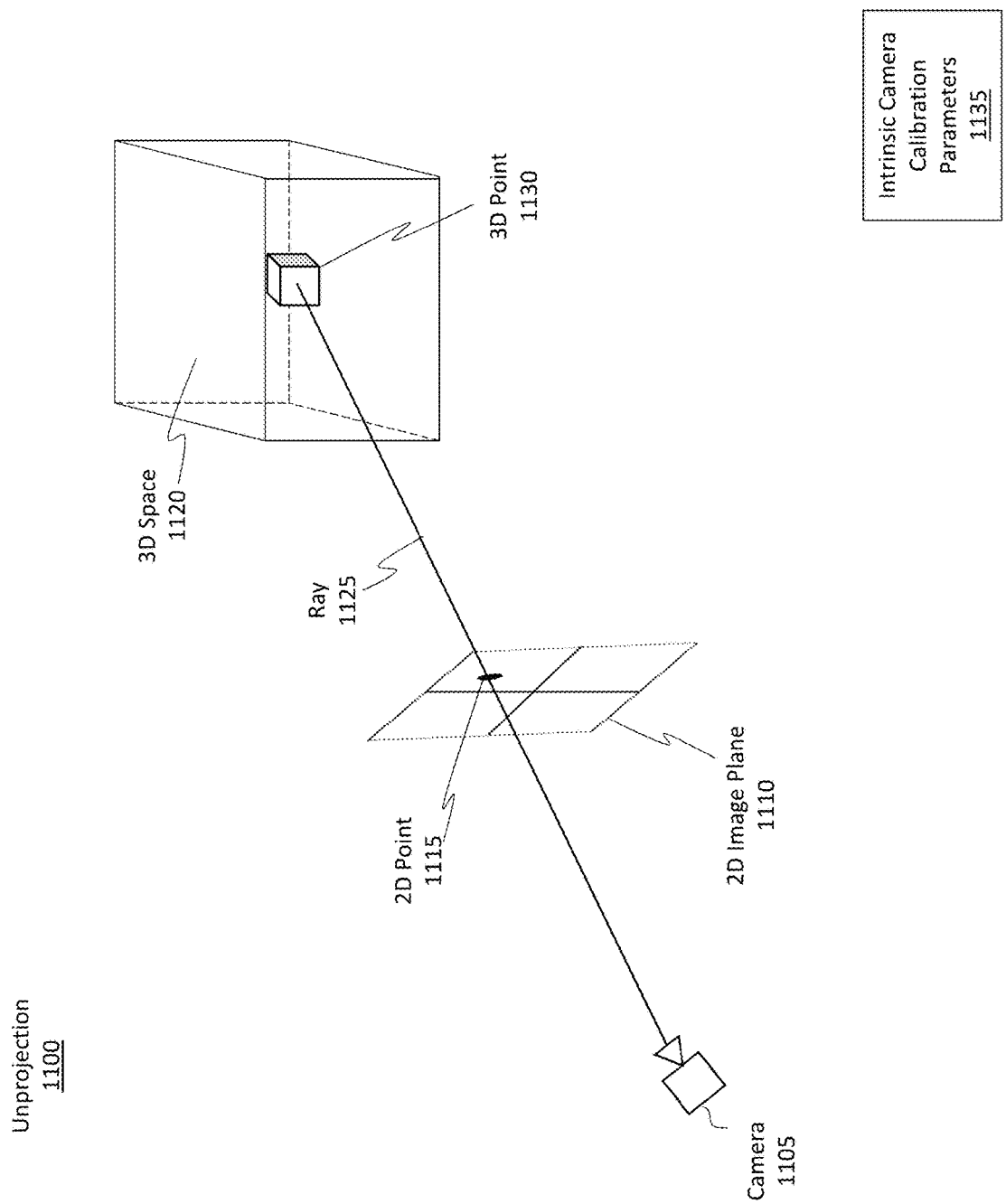
FIG. 11 illustrates an unprojection process where pixels in a 2D image are unprojected to generate a 3D object.

Act 920 involves performing a first alignment process to partially align the first orientation with the second orientation by aligning the first gravity vector with the second gravity vector. Performing this process results in two degrees of freedom of the relative 3D orientation being eliminated. That is, the three degrees of freedom include a yaw (z-axis rotation), pitch (y-axis rotation), and roll (x-axis rotation). The roll angle and the pitch angle in the three degrees of freedom determination are solved for as a result of aligning the gravity vectors of the two different cameras. FIGS. 10 and 11 provide further details on this first alignment process.

Specifically, FIG. 10 shows a process 1000 that constitutes the first alignment process mentioned above. That is, process 1000 details the first alignment process, which operates to partially align the first orientation with the second orientation by aligning the first gravity vector with the second gravity vector. Process 1000 includes an act (act 1005) of unprojecting each pixel in the first camera image into a 3D space to generate a first set of 3D points. That is, the embodiments unproject the points or pixels in the 2D image to points in 3D space. FIG. 11 shows an unprojection 1100 process.

Specifically, FIG. 11 shows a camera 1105. The camera 1105 has generated an image and thus illustrates objects in a 2D image plane 1110, such as the 2D point 1115. To unproject a pixel or point from the 2D image plane 1110 to 3D space 1120, the embodiments compute a ray 1125 from the camera 1105 through the 2D point 1115 out to a depth in the 3D space 1120 to thereby generate a 3D point 1130 (in the 3D space 1120) corresponding to the 2D point 1115 (in the 2D image plane 1110). The depth where the 3D point 1130 is located is determined using the intrinsic camera calibration parameters 1135. That is, these parameters can be used to compute the length of the ray 1125, which corresponds to the depth where the 3D point 1130 will be located.

Returning to FIG. 10, process 1000 also includes an act 1010, which is performed in parallel with act 1005 and which includes unprojecting each pixel in the second camera image into the 3D space to generate a second set of 3D points. This unprojection process is performed in the same manner as was described previously.

Act 1015 then includes projecting both the first set of 3D points and the second set of 3D points back to a 2D plane. This 2D plane, however, is normal to the first gravity vector and the second gravity vector. As a consequence of performing these projections, the two projected sets of points are now aligned with one another along the gravity vector in 2D space. Such alignment eliminates any roll or pitch angles that might exist, thereby eliminating two of the three degrees of freedom of the relative 3D orientation between the two cameras.

Figure 12:
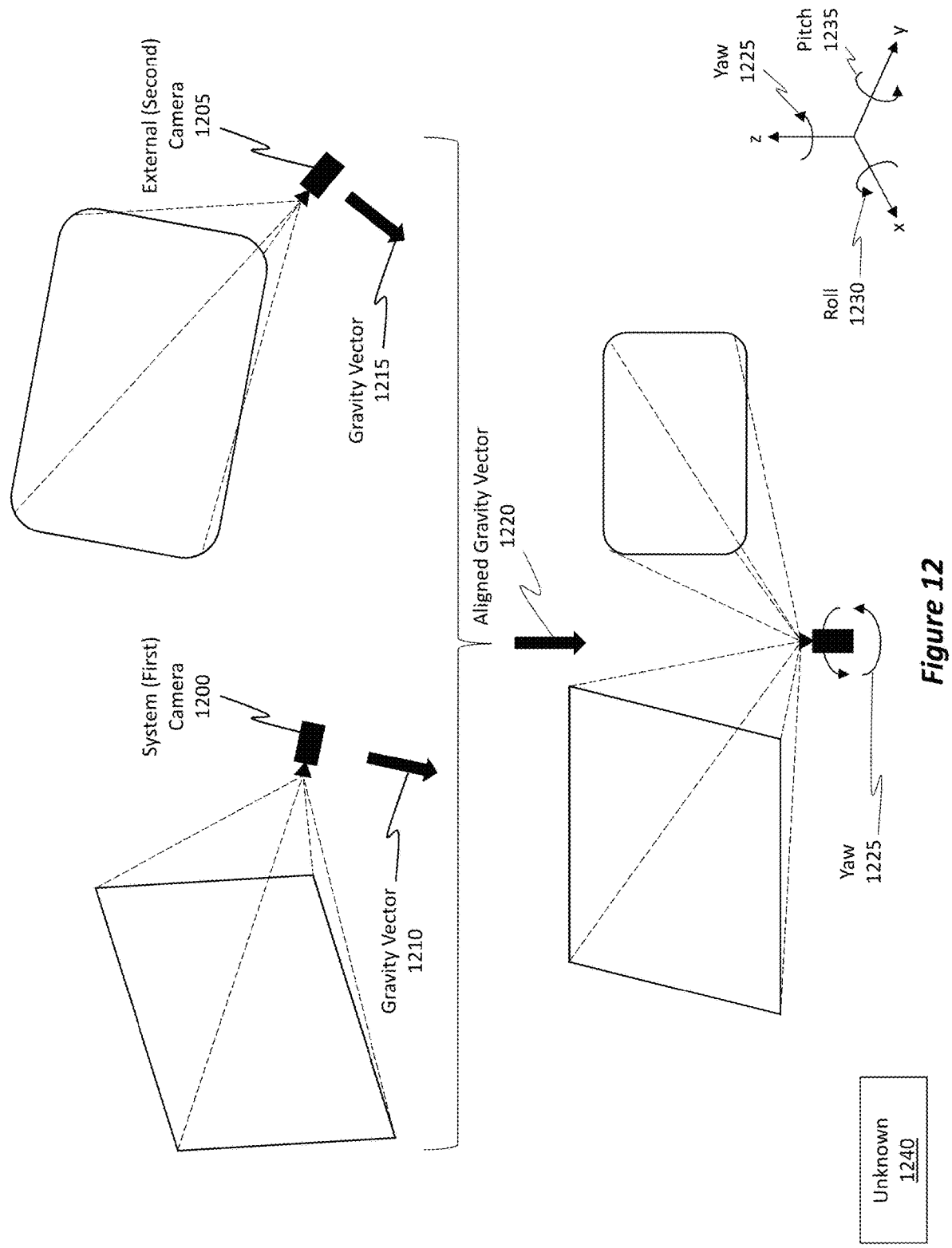
FIG. 12 illustrates how the gravity vectors can be aligned.

FIG. 12 provides a useful illustration for the first alignment process. Specifically, FIG. 12 shows a system (first) camera 1200 and an external (second) camera 1205. The embodiments are able to determine a gravity vector 1210 for the system camera 1200 and a gravity vector 1215 for the external camera 1205. As discussed previously, various unprojection and projection operations can then be performed in order to align the pixels generated by the system camera 1200 with the pixels generated by the external camera 1205 along the same gravity vector, as shown by aligned gravity vector 1220.

FIG. 12 also shows the three degrees of freedom, which include a yaw 1225 along the z-axis, a roll 1230 along the x-axis, and a pitch 1235 along the y-axis. Performing the first alignment process results in eliminating any differences in roll 1230 and pitch 1235 that might exist between the pixels generated by the two different cameras. In this sense, the pixels are now partially aligned. The only remaining unknown 1240 that exists between the two sets of pixels is the difference in yaw 1225 angle. As will be described momentarily, some embodiments rely on visual correspondences to determine or eliminate this third degree of freedom of the relative 3D orientation between the two cameras. Some embodiments rely on a so-called north vector to determine or eliminate this third degree of freedom.

Figure 13:
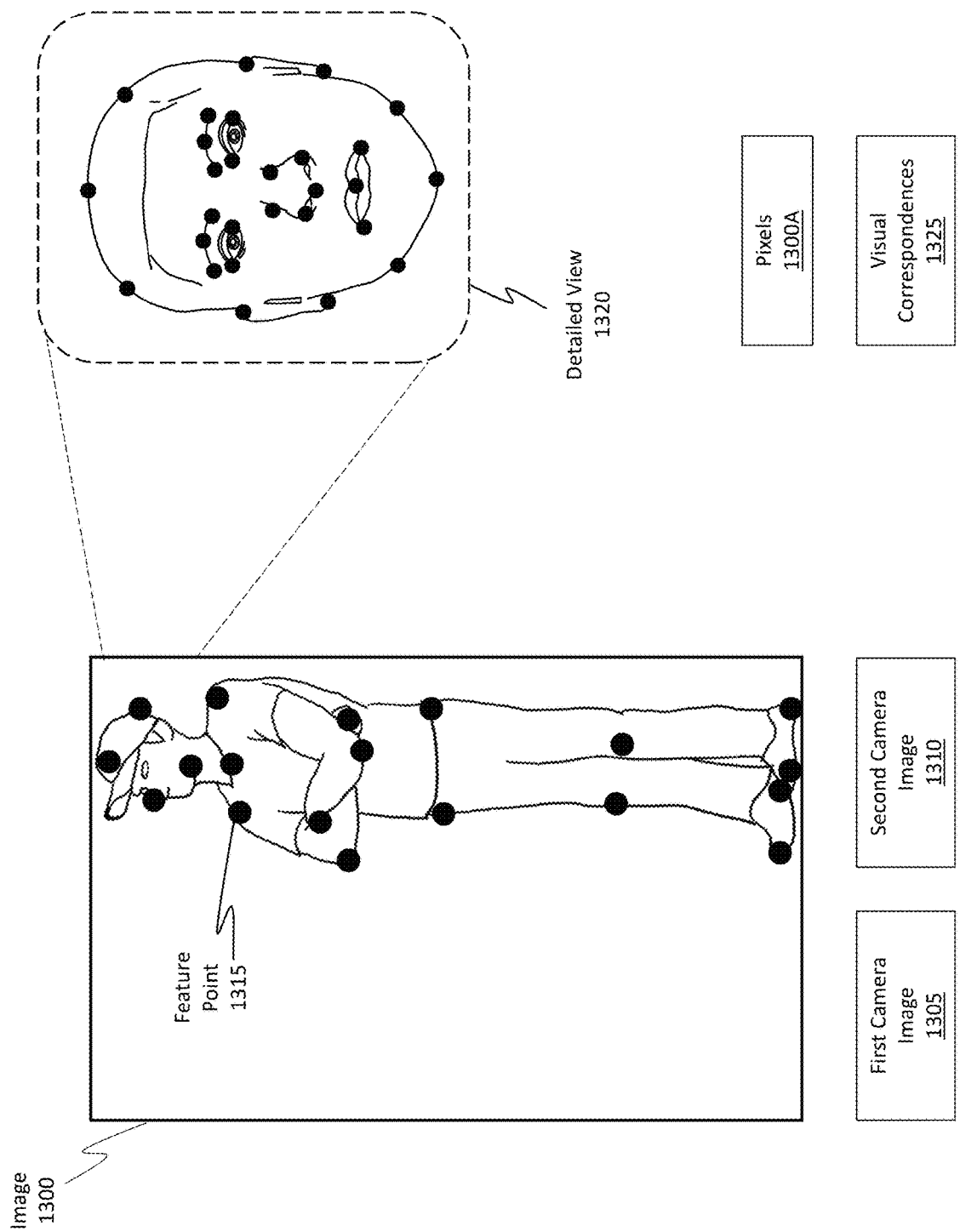
FIG. 13 illustrates an example of identifying visual correspondences in images.

Returning to FIG. 9, method 900 includes an act (act 925) of identifying visual correspondences between the first camera image and the second camera image. FIG. 13 is illustrative.

FIG. 13 shows an image 1300, which includes pixels 1300A and which is representative of either one of the first camera image 1305 or the second camera image 1310 mentioned herein. The embodiments are able to identify feature points within the image 1300, as shown by the feature point 1315. The black circles represent some example feature points. As used herein, the phrase "feature detection" generally refers to the process of computing image abstractions and then determining whether an image feature (e.g., of a particular type) is present at any particular point or pixel in the image. Often, corners (e.g., the corners of a wall), distinguishable edges (e.g., the edge of a table), or ridges are used as feature points because of the inherent or sharp contrasting visualization of an edge or corner. FIG. 13 shows a detailed view 1320 of one portion or section of the image 1300.

The embodiments are able to identify feature points in the first camera image 1305 and also identify corresponding feature points in the second camera image 1310. These commonly identified feature points are referred to as visual correspondences 1325. That is, visual correspondences 1325 refer to pixel content that commonly exists in the first camera image 1305 and the second camera image 1310.

Figure 14:
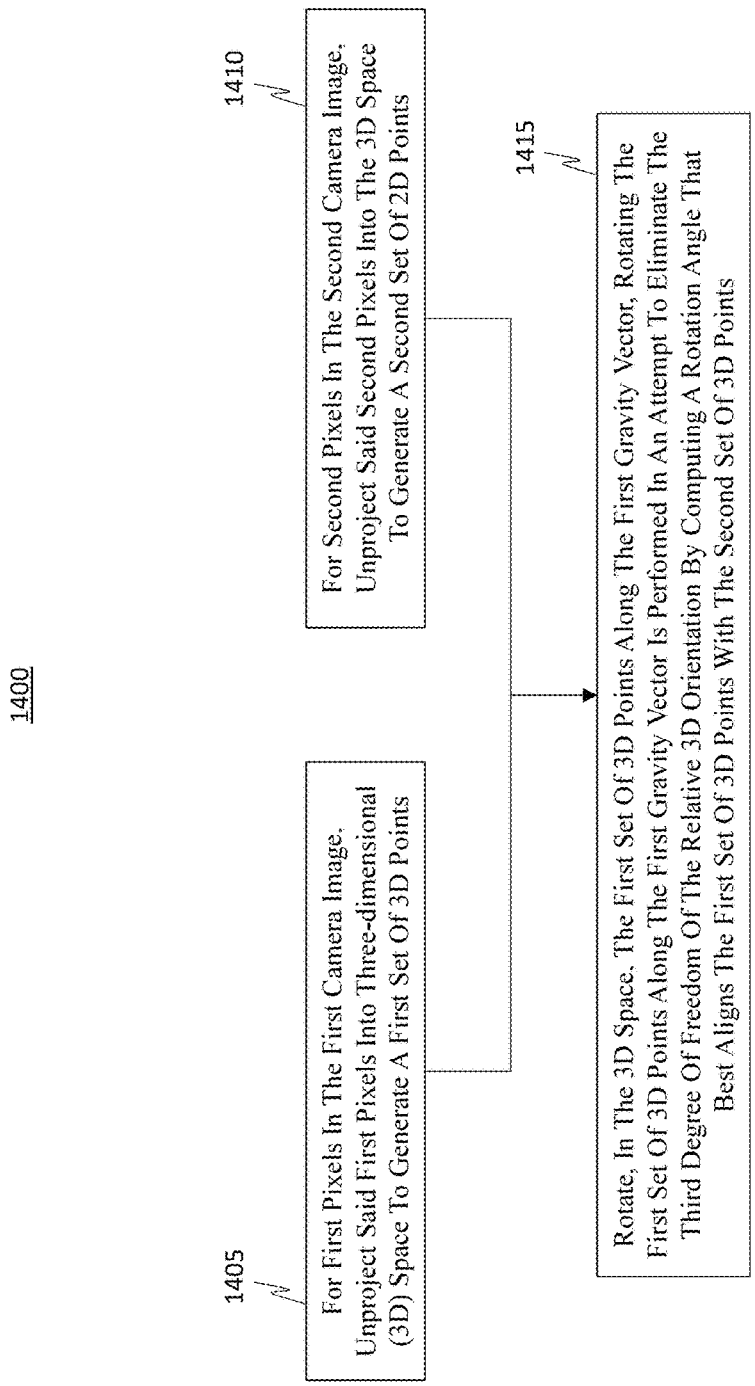
FIG. 14 illustrates an example process flow for using visual correspondences to align images and to eliminate a third degree of freedom of the relative 3D orientation between the two cameras.
Figure 15:
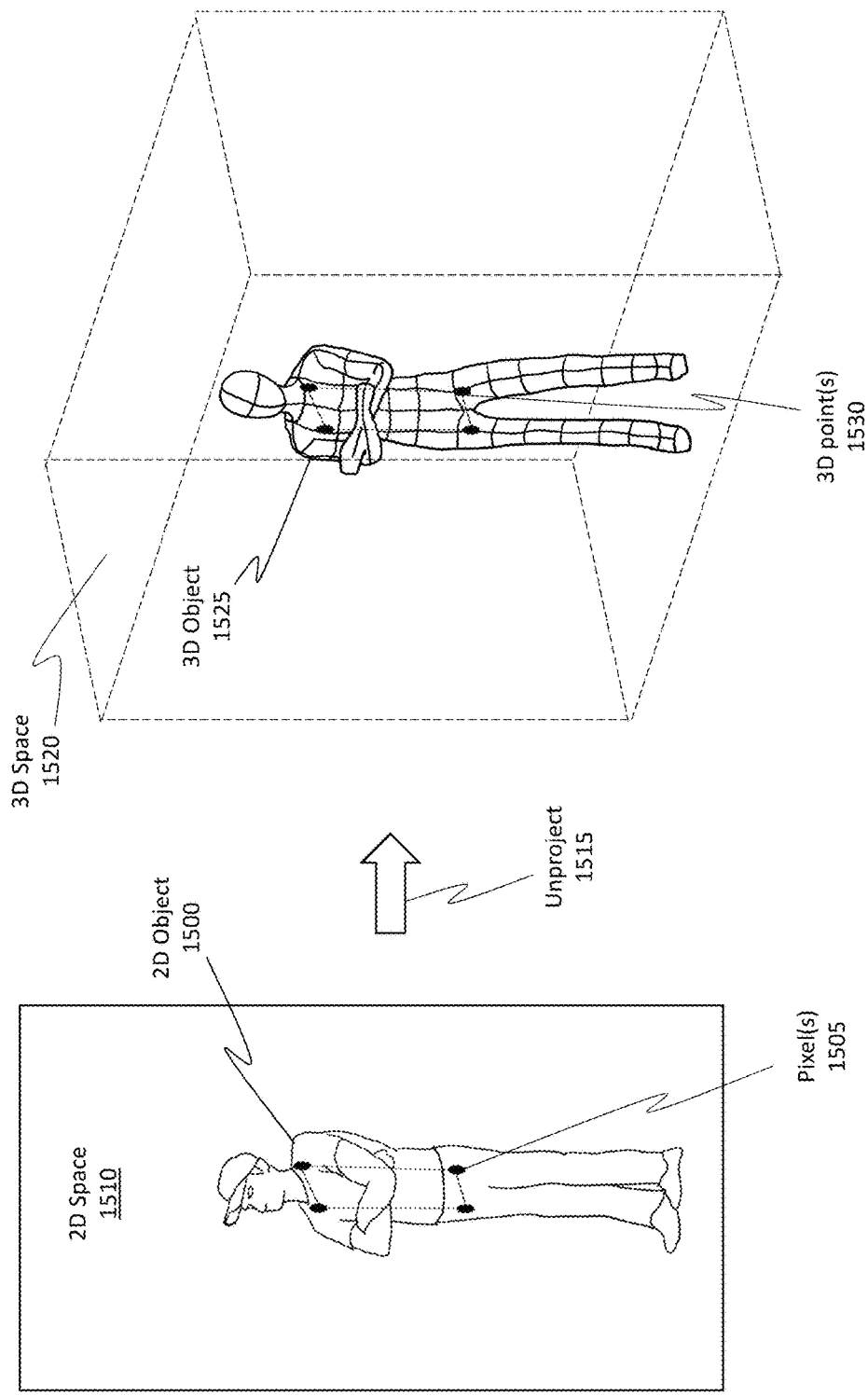
FIG. 15 illustrates another illustration of the unprojection process.
Figure 16:
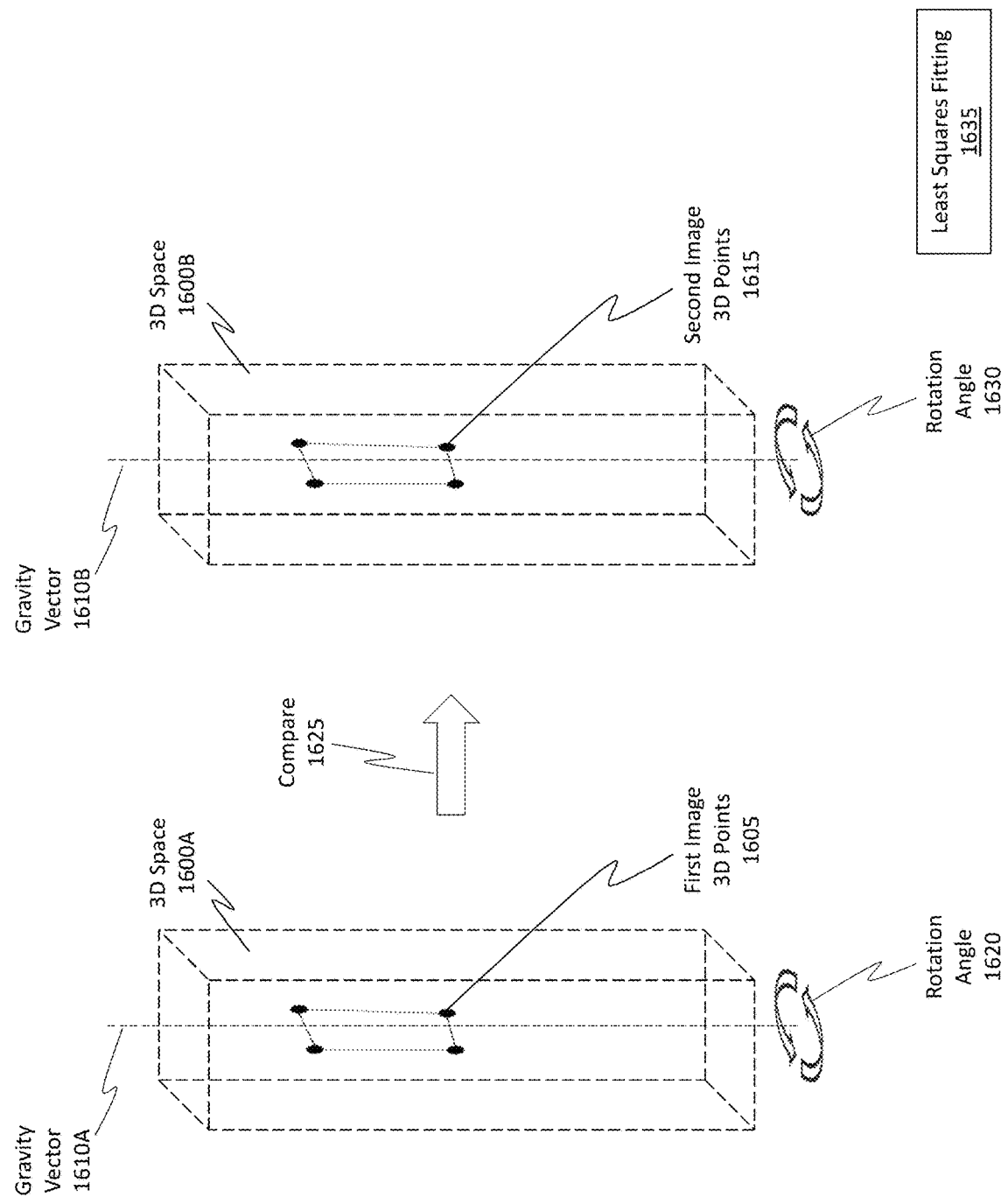
FIG. 16 illustrates how, when operating in the 3D space, the embodiments can rotate unprojected pixels in an attempt to perform an alignment process.

In FIG. 9, method 900 then includes an act (act 930) of performing a second alignment process to fully align the first orientation with the second orientation by using the identified visual correspondences to identify and eliminate a third degree of freedom (e.g., a yaw angle) of the relative 3D orientation. FIGS. 14, 15, and 16 illustrate this second alignment process.

FIG. 14 shows an example process 1400 outlining the operations involved in performing the second alignment process, which fully aligns the first orientation with the second orientation by using the identified visual correspondences to identify and eliminate the third degree of freedom of the relative 3D orientation. Process 1400 includes an act (act 1405) of unprojecting (e.g., for first pixels in the first camera image) the first pixels into three-dimensional (3D) space to generate a first set of 3D points (or rather a third set of pixels if the first alignment process has already been performed). For second pixels in the second camera image, act 1410 involves unprojecting the second pixels into the 3D space to generate a second set of 3D points (or rather a fourth set of pixels). These operations are performed after the images have already been aligned along the gravity vector. FIG. 15 is illustrative.

FIG. 15 shows a 2D object 1500 represented by a set of pixel(s) 1505 in 2D space 1510 (i.e. an image). The embodiments unproject 1515 the pixel(s) 1505 from the 2D space 1510 to 3D space 1520 in accordance with the principles discussed in connection with FIG. 11. As a consequence, a 3D object 1525 comprised of 3D point(s) 1530 is generated in the 3D space 1520. Such operations can be performed for the pixels in the first camera image and for the pixels in the second camera image.

Returning to FIG. 14, in act 1415, the embodiments rotate, in the 3D space, the first/third set of 3D points (or optionally the second/fourth set of 3D points) along the first (or second) gravity vector. The process of rotating the first/third (or second/fourth) set of 3D points along the first (or second) gravity vector is performed in an attempt to eliminate the third degree of freedom of the relative 3D orientation by computing a rotation angle that best aligns the first/third set of 3D points with the second/fourth set of 3D points. FIG. 16 is illustrative.

FIG. 16 shows a 3D space 1600A that includes the unprojected pixels from the first camera image, as shown by first image 3D points 1605. The first image 3D points 1605 are aligned based on a gravity vector 1610A, as discussed previously. Also shown is the 3D space 1600B, which can be the same space as the 3D space 1600A, and a gravity vector 1610B, which can be the same as the gravity vector 1610A. The unprojected pixels from the second camera image are included in the 3D space 1600B, as represented by the second image 3D points 1615.

As stated in act 1415, the embodiments are able to rotate one or both of the first image 3D points 1605 and/or second image 3D points 1615 in the 3D space along the gravity vector and then perform a comparison, as shown by compare 1625. The rotation angle 1620 and 1630 symbolizes the ability to rotate the points along the gravity vector. The rotations are performed in an attempt to align the first image 3D points 1605 with the second image 3D points 1615, or vice versa. That is, the embodiments perform a rotation and compute an angle (e.g., the rotation angle 1620 or 1630) that best aligns the first or second image 3D points with the other one of the first or second image 3D points. The embodiments select a rotation angle 1620 and then compare 1625 the points at that angle against the points included in the second image 3D point 1615.

To be clear, the process of unprojecting the first pixels and the second pixels into the 3D space is performed using intrinsic camera calibration parameters. Furthermore, the process of computing the rotation angle that best aligns the first/third set of 3D points with the second/fourth set of 3D points includes identifying whichever rotation angle minimizes summed up 3D distances computed between the rotated first/third set of 3D points and corresponding 3D points included in the second/fourth set of 3D points.

In some embodiments, the resulting rotation angle, which represents the third degree of freedom of the relative 3D orientation, is computed using a least squares fitting 1635. In some embodiments, a Wahba technique can be performed as a part of the second alignment process. Briefly, the Wahba technique is a technique designed to final a particular rotation matrix that exists between different coordinate systems. In some embodiments, a brute force technique is performed where any number of rotations are performed until a best fit angle is identified.

As a result of performing the second alignment process, the embodiments have now fully aligned the pixels from the first and second images. That is, the embodiments have solved for, or rather eliminated, any differences that might have existed in the three degrees of freedom for the relative 3D orientation between the two cameras. In other words, the embodiments eliminated any differences in yaw, pitch, and roll that might have existed between the orientations of the two cameras.

Returning to FIG. 9, method 900 then includes an act (act 935) which is performed subsequent to performing the first alignment process and the second alignment process. Act 935 includes generating an overlaid image by overlaying content included in one of the first camera image or the second camera image onto corresponding content included in the other one of the first camera image or the second camera image. For instance, the overlaid image 600 can be an example of the resulting overlaid image mentioned in act 925. Performing the second alignment process can, in some instances, correct for parallax that might exist between the two images. That is, by aligning images using visual correspondences, the second alignment process can correct for parallax that might exist.

Aligning Image Data Using Gravity Vectors and North Vectors

Figure 17:
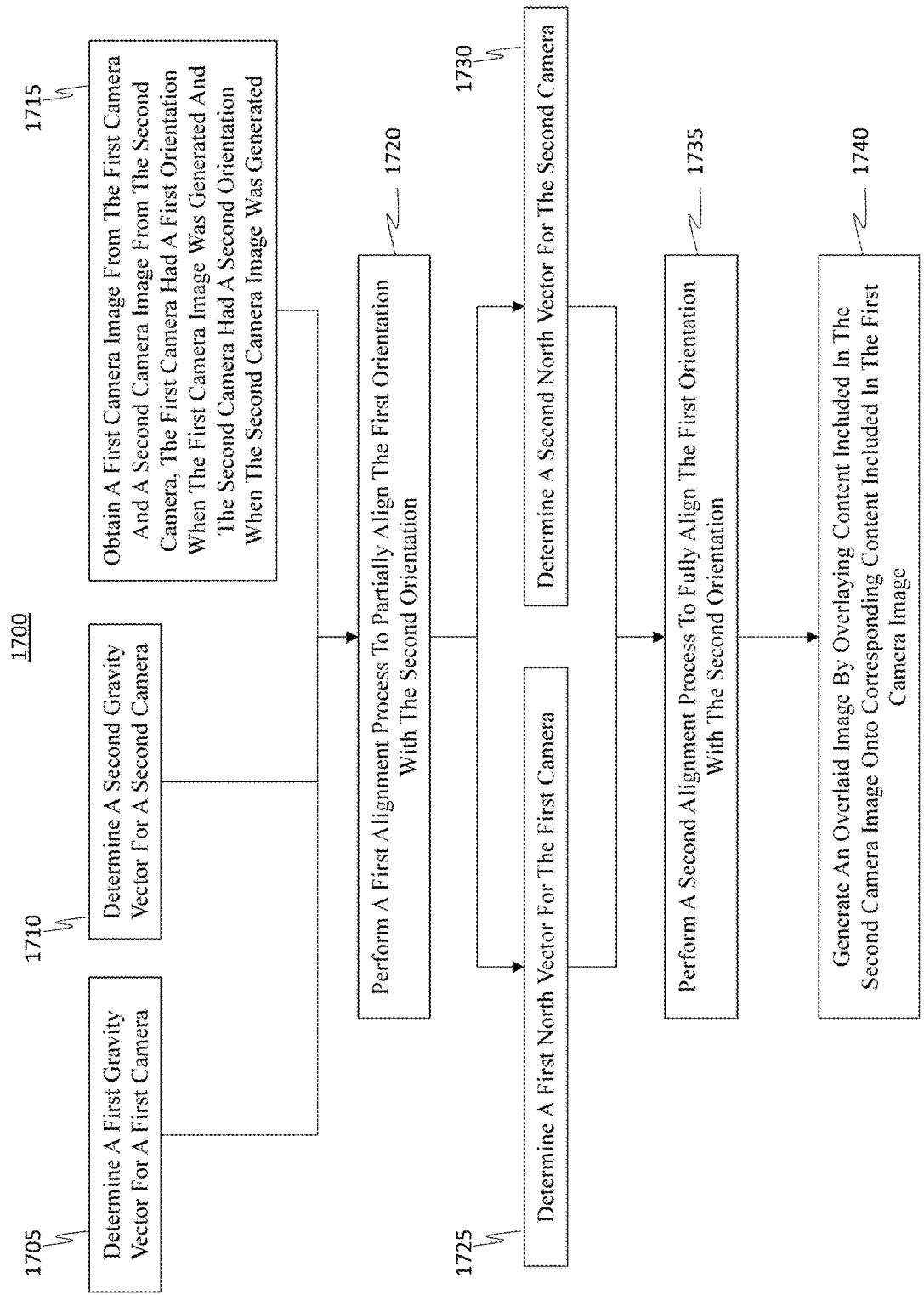
FIG. 17 illustrates a flowchart of an example method for aligning images by aligning gravity vectors and north vectors.
Figure 18:
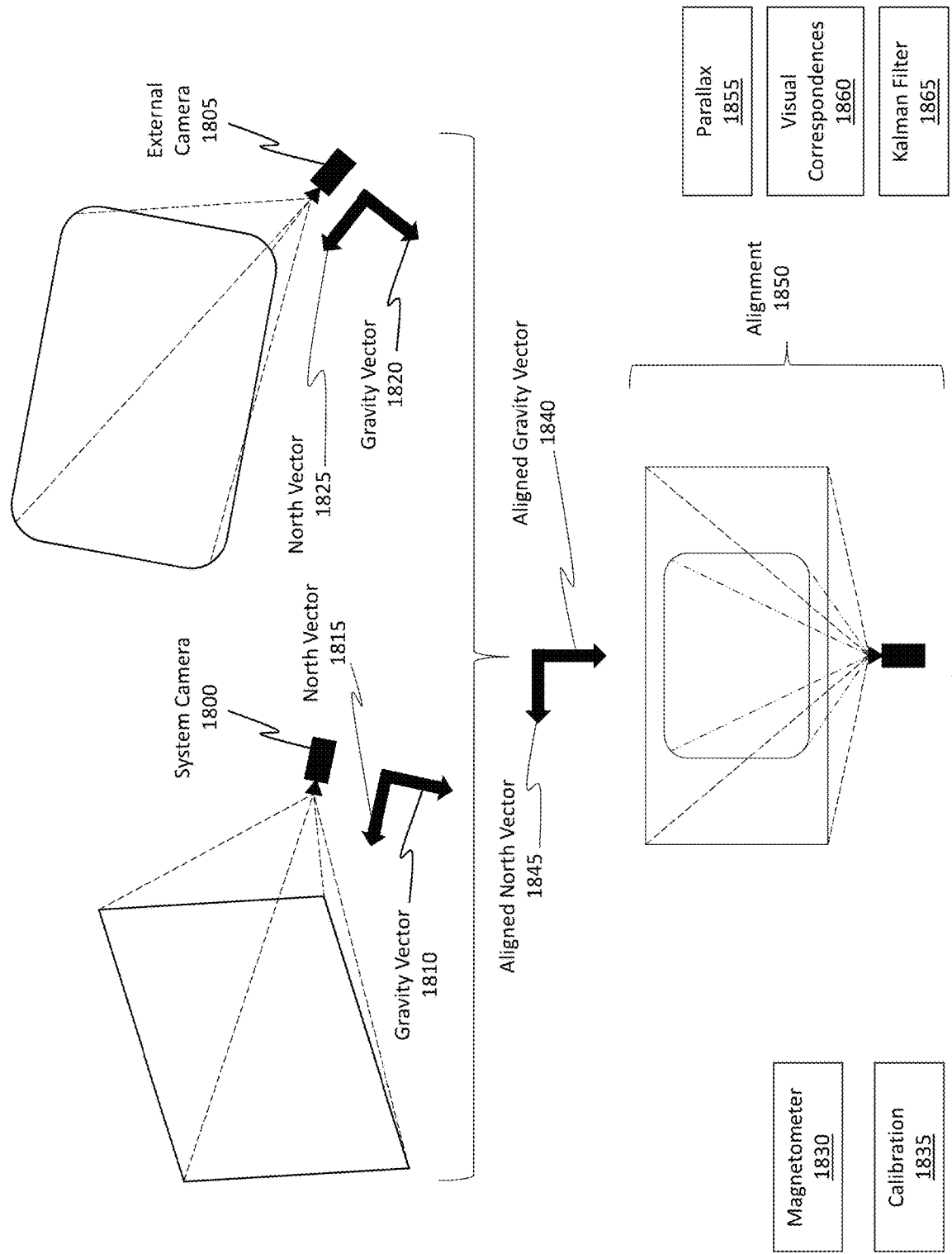
FIG. 18 illustrates an example process for aligning gravity vectors and north vectors.
Figure 19:
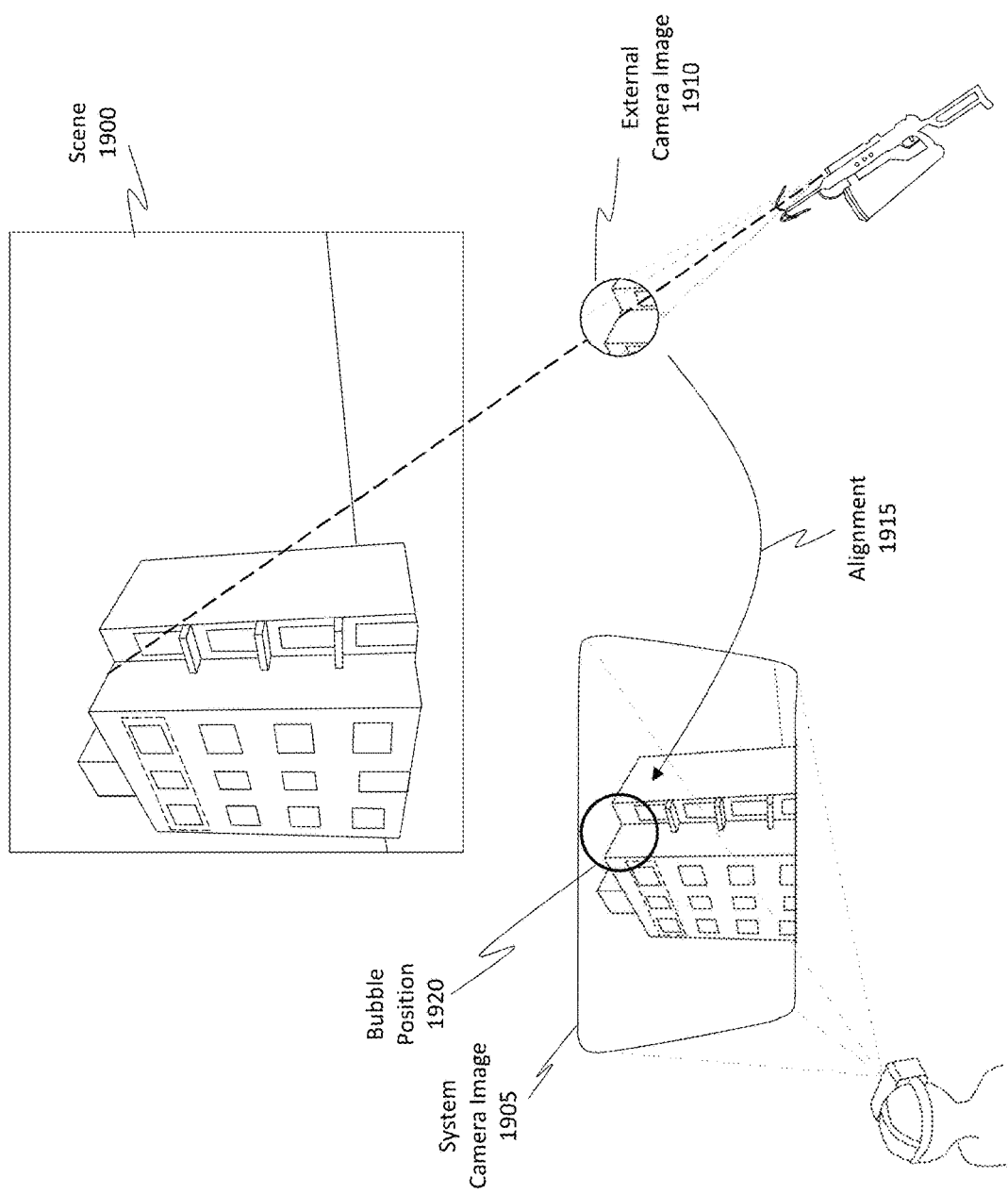
FIG. 19 illustrates how an overlaid image can be generated.

FIGS. 17 through 19 illustrate another technique for aligning images. In particular, FIG. 17 focuses on a method 1700 for aligning images generated by two cameras, where the alignment is performed by computing a relative three-dimensional (3D) orientation between the two cameras. Whereas the method 900 of FIG. 9 relied on visual correspondences to perform the final alignment, the method 1700 relies on "north vectors" to perform the final alignment.

Method 1700 includes an act (act 1705) of determining a first gravity vector for a first camera. Act 1710 involves determining a second gravity vector for a second camera that is physically detached from the first camera. Act 1715 involves obtaining a first camera image from the first camera and a second camera image from the second camera. The first camera had a first orientation when the first camera image was generated and the second camera had a second orientation when the second camera image was generated. Notice, acts 1705, 1710, and 1715 correspond to acts 905, 910, and 915, respectively.

Act 1720 then involves performing a first alignment process to partially align the first orientation with the second orientation. This first alignment is performed by aligning the first gravity vector with the second gravity vector, thereby resulting in two degrees of freedom of the relative 3D orientation being eliminated. Act 1720 corresponds to act 920 in FIG. 9.

Act 1725 then includes determining a first north vector for the first camera. Similarly, act 1730 includes determining a second north vector for the second camera. These so-called "north vectors" can be determined using a magnetometer (i.e. a type of compass) to determine which direction is the north direction. Therefore, in addition to identifying a gravity vector, the embodiments also identify a north vector.

A second alignment process is then performed in act 1735. This second alignment process is performed in order to fully align the first orientation with the second orientation. Further, this process is performed by aligning the first north vector with the second north vector, thereby resulting in a third degree of freedom of the relative 3D orientation being eliminated. Subsequent to performing the first alignment process and the second alignment process, act 1740 includes generating an overlaid image by overlaying content included in one of the first camera image or the second camera image onto corresponding content included in the other one of the first camera image or the second camera image. FIGS. 18 and 19 provide additional details.

FIG. 18 shows a system camera 1800 (e.g., the first camera) and an external camera 1805 (e.g., the second camera). As discussed previously, the embodiments are able to determine a gravity vector 1810 for the system camera 1800 using an IMU of the system camera 1800. In addition to determining that gravity vector 1810, the embodiments are also configured to determine a north vector 1815 for the system camera 1800. Relatedly, the embodiments are able to determine a gravity vector 1820 and a north vector 1825 for the external camera 1805.

To determine the north vectors, the system camera 1800 and the external camera 1805 are each respectively equipped with a magnetometer, as shown by magnetometer 1830. This magnetometer 1830 is calibrated and can be periodically recalibrated to ensure its accuracy, as shown by calibration 1835. In this regard, the process of determining the first north vector for the first camera is performed using a first magnetometer, and the process of determining the second north vector for the second camera is performed using a second magnetometer.

Having identified the gravity vectors and the north vectors, the embodiments are able to align the gravity vectors in the manner described previously, as now shown by aligned gravity vector 1840. Similarly, the embodiments are able to align the north vectors, as shown by aligned north vector 1845. The second alignment process, which is performed to fully align the first orientation with the second orientation by aligning the first north vector with the second north vector, is performed in a manner similar to the first alignment process except now relies on the north vectors.

To illustrate, the second alignment process includes, for first pixels in the first camera image, unprojecting these first pixels into three-dimensional (3D) space to generate a first set of 3D points. The alignment process further includes, for second pixels in the second camera image, unprojecting these second pixels into the 3D space to generate a second set of 3D points. The embodiments then project both the first set of 3D points and the second set of 3D points to a two-dimensional (2D) plane that is normal to the first north vector and the second north vector. Whereas the first alignment process projected the 3D points to a 2D plane that was normal to the gravity vector, this second alignment process projects the 3D points to the 2D plane that is normal to the north vector.

FIG. 18 shows the resulting alignment 1850, which is achieved as a result of performing the two alignment processes. Notably, aligning the images based solely on the gravity and north vectors may result in a scenario where parallax 1855 exists between the two images, resulting in a skewing or misalignment when those images are combined. That is, aligning images based on non-image data (i.e. not on visual correspondences 1860) often results in parallax 1855.

Therefore, in order to resolve any parallax 1855 that might exist between the two images, the embodiments can additionally identify visual correspondences 1860 that exist between the two images, using the techniques mentioned previously. With these visual correspondences 1860, the embodiments can then perform various transformations in order to adjust the image content to correct for parallax 1855. In some embodiments, a Kalman filter 1865 can be used to facilitate the alignment and blending of the images when generating an overlaid image. Thus, a parallax correction process can be performed to correct for parallax when generating the resulting overlaid image, and this parallax correction process can involve identifying visual correspondences.

It should be noted that performing the first alignment process and the second alignment process (i.e. the one dependent on the north vectors) can be performed without a dependence on isothermal contrasts that may or may not be present in the first camera image and/or the second camera image.

FIG. 19 shows a scene 1900 where a first and second camera are operating. Here, the first camera generates a system (first) camera image 1905, and the second camera generates an external (second) camera image 1910. By following the disclosed principles, the embodiments are able to compute gravity vectors. In some cases, the embodiments then perform an alignment using the gravity vectors and visual correspondences. In some cases, the embodiments perform an alignment using the gravity vectors and north vectors. In any event, the embodiments are able to perform an alignment 1915 between the system camera image 1905 and the external camera image 1910 to generate an overlaid image. In some cases, a bubble can be displayed in the overlaid image at a particular location, as shown by the bubble position 1920. The bubble position 1920 corresponds to the boundary of where the content from the external camera image 1910 is located in the overlaid image. Accordingly, the embodiments are focused on improved techniques for aligning images from multiple different cameras.

Example Computer/Computer systems

Figure 20:
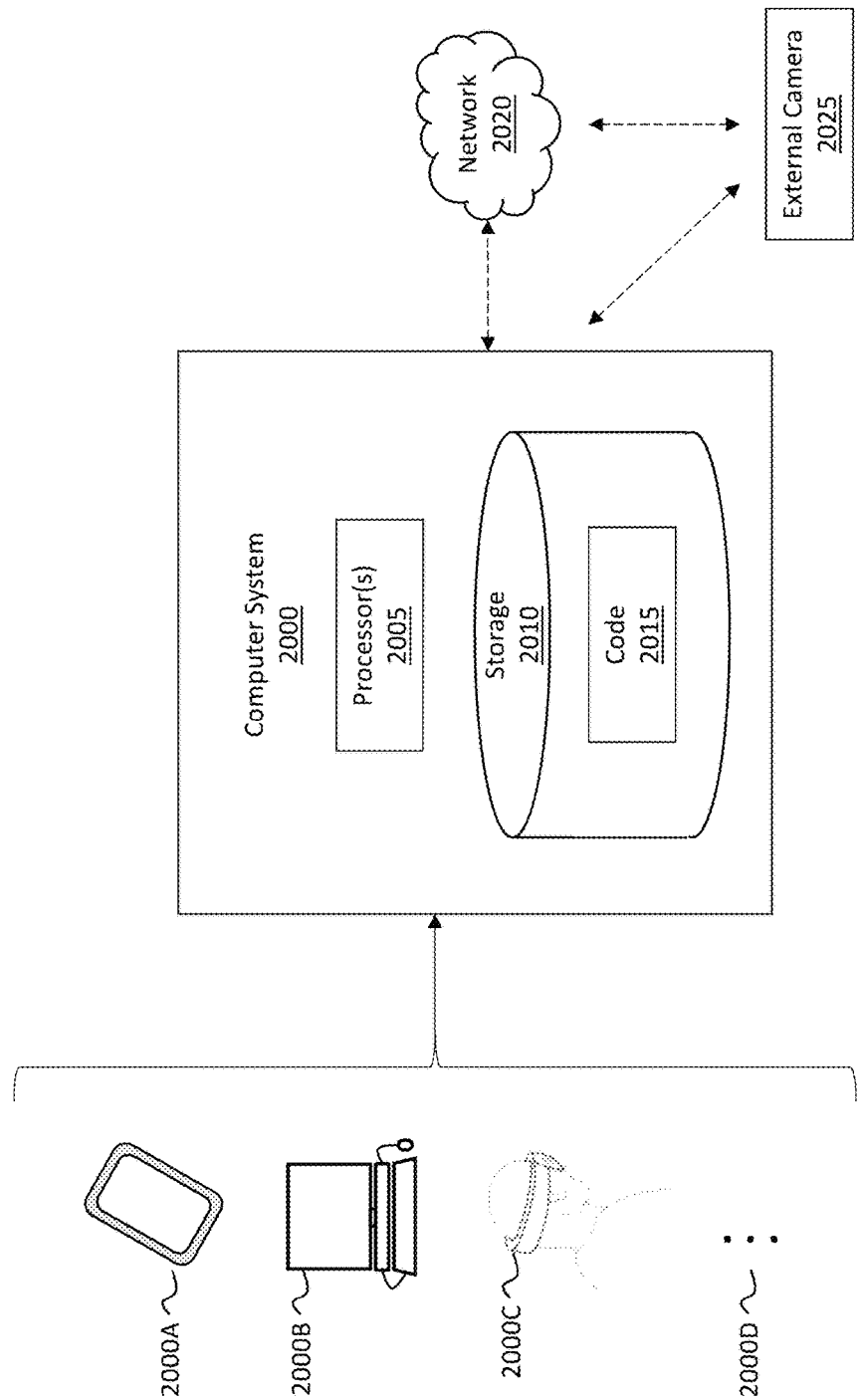
FIG. 20 illustrates an example computer system capable of performing any of the disclosed operations.

Attention will now be directed to FIG. 20 which illustrates an example computer system 2000 that may include and/or be used to perform any of the operations described herein. Computer system 2000 may take various different forms. For example, computer system 2000 may be embodied as a tablet 2000A, a desktop or a laptop 2000B, a wearable device 2000C, a mobile device, or any other standalone device. The ellipsis 2000D illustrates other form factors can be used. Computer system 2000 may also be a distributed system that includes one or more connected computing components/devices that are in communication with computer system 2000.

In its most basic configuration, computer system 2000 includes various different components. FIG. 20 shows that computer system 2000 includes one or more processor(s) 2005 (aka a "hardware processing unit") and storage 2010.

Regarding the processor(s) 2005, it will be appreciated that the functionality described herein can be performed, at least in part, by one or more hardware logic components (e.g., the processor(s) 2005). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 2000. The different components, modules, engines, and services described herein may be implemented as objects or processors that execute on computer system 2000 (e.g. as separate threads).

Storage 2010 may be physical system memory, which may be volatile, non-volatile, or some combination of the two. The term "memory" may also be used herein to refer to non-volatile mass storage such as physical storage media. If computer system 2000 is distributed, the processing, memory, and/or storage capability may be distributed as well.

Storage 2010 is shown as including executable instructions (i.e. code 2015). The executable instructions represent instructions that are executable by the processor(s) 2005 of computer system 2000 to perform the disclosed operations, such as those described in the various methods.

The disclosed embodiments may comprise or utilize a special-purpose or general-purpose computer including computer hardware, such as, for example, one or more processors (such as processor(s) 2005) and system memory (such as storage 2010), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RANI, ROM, EEPROM, CD-ROM, solid state drives ("SSD") that are based on RANI, Flash memory, phasechange memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2000 may also be connected (via a wired or wireless connection) to external sensors (e.g., one or more remote cameras) or devices via a network 2020. For example, computer system 2000 can communicate with any number devices (e.g., external camera 2025) or cloud services to obtain or process data. In some cases, network 2020 may itself be a cloud network. Furthermore, computer system 2000 may also be connected through one or more wired or wireless networks to remote/separate computer systems(s) that are configured to perform any of the processing described with regard to computer system 2000.

A "network," like network 2020, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2000 will include one or more communication channels that are used to communicate with the network 2020. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for aligning images generated by two cameras, where the alignment is performed by computing a relative three-dimensional (3D) orientation between the two cameras, said method comprising:

determining a first gravity vector for a first camera;

determining a second gravity vector for a second camera that is physically detached from the first camera;

obtaining a first camera image from the first camera and a second camera image from the second camera, wherein the first camera had a first orientation when the first camera image was generated and the second camera had a second orientation when the second camera image was generated;

performing a first alignment process to partially align the first orientation with the second orientation by aligning the first gravity vector with the second gravity vector, thereby resulting in two degrees of freedom of the relative 3D orientation being eliminated;

identifying visual correspondences between the first camera image and the second camera image;

performing a second alignment process to fully align the first orientation with the second orientation by using the identified visual correspondences to identify and eliminate a third degree of freedom of the relative 3D orientation; and subsequent to performing the first alignment process and the second alignment process, generating an overlaid image by overlaying content included in one of the first camera image or the second camera image onto corresponding content included in the other one of the first camera image or the second camera image.

2. The method of claim 1, wherein the first camera is a head-mounted device (HMD) camera, and wherein the second camera is an external camera attached to a tool.

3. The method of claim 1, wherein the first gravity vector is determined using a first inertial measurement unit (IMU), and wherein the second gravity vector is determined using a second IMU.

4. The method of claim 1, wherein performing the second alignment process to fully align the first orientation with the second orientation by using the identified visual correspondences to identify and eliminate the third degree of freedom of the relative 3D orientation is performed by:

for first pixels in the first camera image, unproject said first pixels into three-dimensional (3D) space to generate a first set of 3D points;

for second pixels in the second camera image, unproject said second pixels into the 3D space to generate a second set of 3D points; and rotate, in the 3D space, the first set of 3D points along the first gravity vector, wherein rotating the first set of 3D points along the first gravity vector is performed in an attempt to eliminate the third degree of freedom of the relative 3D orientation by computing a rotation angle that best aligns the first set of 3D points with the second set of 3D points.

5. The method of claim 4, wherein unprojecting the first pixels and the second pixels into the 3D space is performed using intrinsic camera calibration parameters.

6. The method of claim 4, wherein the rotation angle, which represents the third degree of freedom of the relative 3D orientation, is computed using a least squares fitting, and wherein computing the rotation angle that best aligns the first set of 3D points with the second set of 3D points includes identifying whichever rotation angle minimizes summed up 3D distances computed between the rotated first set of 3D points and corresponding 3D points included in the second set of 3D points.

7. The method of claim 1, wherein performing the first alignment process to partially align the first orientation with the second orientation by aligning the first gravity vector with the second gravity vector is performed by:

unprojecting each pixel in the first camera image into three-dimensional (3D) space to generate a first set of 3D points;

unprojecting each pixel in the second camera image into the 3D space to generate a second set of 3D points; and projecting both the first set of 3D points and the second set of 3D points to a two-dimensional (2D) plane that is normal to the first gravity vector and the second gravity vector.

8. The method of claim 7, wherein performing the second alignment process to fully align the first orientation with the second orientation by using the identified visual correspondences to identify and eliminate the third degree of freedom of the relative 3D orientation is performed by:

for first pixels in the first camera image, unproject said first pixels into three-dimensional (3D) space to generate a third set of 3D points;

for second pixels in the second camera image, unproject said second pixels into the 3D space to generate a fourth set of 3D points; and rotate, in the 3D space, the third set of 3D points along the first gravity vector, wherein rotating the third set of 3D points along the first gravity vector is performed in an attempt to eliminate the third degree of freedom of the relative 3D orientation by computing a rotation angle that best aligns the third set of 3D points with the fourth set of 3D points.

9. The method of claim 1, wherein a Wahba technique is performed as a part of the second alignment process.

10. The method of claim 1, wherein performing the second alignment process corrects for parallax.

11. A computer system configured to align images generated by two cameras, where the alignment is performed by computing a relative three-dimensional (3D) orientation between the two cameras, said computer system comprising:

one or more processors; and one or more computer-readable hardware storage devices that store instructions that are executable by the one or more processors to cause the computer system to:

determine a first gravity vector for a first camera;

determine a second gravity vector for a second camera that is physically detached from the first camera;

obtain a first camera image from the first camera and a second camera image from the second camera, wherein the first camera had a first orientation when the first camera image was generated and the second camera had a second orientation when the second camera image was generated;

perform a first alignment process to partially align the first orientation with the second orientation by aligning the first gravity vector with the second gravity vector, thereby resulting in two degrees of freedom of the relative 3D orientation being eliminated;

identify visual correspondences between the first camera image and the second camera image;

perform a second alignment process to fully align the first orientation with the second orientation by using the identified visual correspondences to identify and eliminate a third degree of freedom of the relative 3D orientation; and subsequent to performing the first alignment process and the second alignment process, generate an overlaid image by overlaying content included in one of the first camera image or the second camera image onto corresponding content included in the other one of the first camera image or the second camera image.

12. The computer system of claim 11, wherein the first camera is a head-mounted device (HMD) camera, and wherein the second camera is an external camera attached to a tool.

13. The computer system of claim 11, wherein the first gravity vector is determined using a first inertial measurement unit (IMU), and wherein the second gravity vector is determined using a second IMU.

14. The computer system of claim 11, wherein performing the second alignment process to fully align the first orientation with the second orientation by using the identified visual correspondences to identify and eliminate the third degree of freedom of the relative 3D orientation is performed by:

for first pixels in the first camera image, unproject said first pixels into three-dimensional (3D) space to generate a first set of 3D points;

for second pixels in the second camera image, unproject said second pixels into the 3D space to generate a second set of 2D points; and rotate, in the 3D space, the first set of 3D points along the first gravity vector, wherein rotating the first set of 3D points along the first gravity vector is performed in an attempt to eliminate the third degree of freedom of the relative 3D orientation by computing a rotation angle that best aligns the first set of 3D points with the second set of 3D points.

15. The computer system of claim 14, wherein unprojecting the first pixels and the second pixels into the 3D space is performed using intrinsic camera calibration parameters, and wherein computing the rotation angle that best aligns the first set of 3D points with the second set of 3D points includes identifying whichever rotation angle minimizes summed up 3D distances computed between the rotated first set of 3D points and corresponding 3D points included in the second set of 3D points.

16. The computer system of claim 14, wherein the rotation angle, which represents the third degree of freedom of the relative 3D orientation, is computed using a least squares fitting.

17. The computer system of claim 11, wherein performing the first alignment process to partially align the first orientation with the second orientation by aligning the first gravity vector with the second gravity vector is performed by:
- unprojecting each pixel in the first camera image into three-dimensional (3D) space to generate a first set of 3D points;
- unprojecting each pixel in the second camera image into the 3D space to generate a second set of 3D points; and
- projecting both the first set of 3D points and the second set of 3D points to a two-dimensional (2D) plane that is normal to the first gravity vector and the second gravity vector.

18. The computer system of claim 17, wherein performing the second alignment process to fully align the first orientation with the second orientation by using the identified visual correspondences to identify and eliminate the third degree of freedom of the relative 3D orientation is performed by:
- for first pixels in the first camera image, unproject said first pixels into three-dimensional (3D) space to generate a first set of 3D points;
- for second pixels in the second camera image, unproject said second pixels into the 3D space to generate a second set of 2D points; and
- rotate, in the 3D space, the first set of 3D points along the first gravity vector, wherein rotating the first set of 3D points along the first gravity vector is performed in an attempt to eliminate the third degree of freedom of the relative 3D orientation by computing a rotation angle that best aligns the first set of 3D points with the second set of 3D points.

19. A head-mounted device (HMD) configured to align images generated by two cameras, where the alignment is performed by computing a relative three-dimensional (3D) orientation between the two cameras, said HMD comprising:
- an HMD camera;
- one or more processors; and
- one or more computer-readable hardware storage devices that store instructions that are executable by the one or more processors to cause the computer system to:
  - determine a first gravity vector for the HMD camera;
  - determine a second gravity vector for a second camera that is physically detached from the HMD camera;
  - obtain a first camera image from the HMD camera and a second camera image from the second camera, wherein the HMD camera had a first orientation when the first camera image was generated and the second camera had a second orientation when the second camera image was generated;
  - perform a first alignment process to partially align the first orientation with the second orientation by aligning the first gravity vector with the second gravity vector, thereby resulting in two degrees of freedom of the relative 3D orientation being eliminated;
  - identify visual correspondences between the first camera image and the second camera image;
  - perform a second alignment process to fully align the first orientation with the second orientation by using the identified visual correspondences to identify and eliminate a third degree of freedom of the relative 3D orientation; and
- subsequent to performing the first alignment process and the second alignment process, generate an overlaid image by overlaying content included in one of the first camera image or the second camera image onto corresponding content included in the other one of the first camera image or the second camera image.

20. The HMD of claim 19, wherein performing the second alignment process corrects for parallax.

* * * * *